US008315391B2

(12) United States Patent
Inano et al.

(10) Patent No.: US 8,315,391 B2
(45) Date of Patent: Nov. 20, 2012

(54) INFORMATION ACCESS SYSTEM, READER/WRITER DEVICE AND CONTACTLESS INFORMATION STORAGE DEVICE

(75) Inventors: Satoshi Inano, Kanagawa (JP); Isamu Yamada, Kanagawa (JP); Shinichi Shiotsu, Kanagawa (JP); Akira Itasaki, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 1411 days.

(21) Appl. No.: 11/790,735

(22) Filed: Apr. 27, 2007

(65) Prior Publication Data

US 2008/0104392 A1 May 1, 2008

(30) Foreign Application Priority Data

Oct. 26, 2006 (JP) ................................ 2006-290788

(51) Int. Cl.
*H04L 29/06* (2006.01)

(52) U.S. Cl. ....... 380/273; 713/150; 713/164; 340/10.2; 370/311; 370/336

(58) Field of Classification Search .................. 713/150, 713/164; 380/273; 340/10.2; 370/311, 336
See application file for complete search history.

(56) References Cited

U.S. PATENT DOCUMENTS 6,922,402 B1 7/2005 Ko
6,980,795 B1 12/2005 Hermann et al.
2005/0282521 A1* 12/2005 Hermann et al. ............ 455/410
2006/0065731 A1* 3/2006 Powell et al. ................ 235/451
2006/0175408 A1* 8/2006 Becker et al. ................ 235/451

FOREIGN PATENT DOCUMENTS

JP 2000-113130 A 4/2000
JP 2001-189721 A 7/2001
JP 2001-251210 A 9/2001
JP 2005-141529 A 6/2005
WO WO 97/43740 A1 11/1997

OTHER PUBLICATIONS

Feldhofer, Martin, "A Proposal for an Authentication Protocol in a Security Layer for RFID Smart Tags", The 12th IEEE Mediterranean Electrotechnical Conference, MELECON 2004, IEEE Proceedings, May 2004.*

* cited by examiner

*Primary Examiner* — Jeffrey D Popham
*Assistant Examiner* — Tracy Mangialaschi
(74) *Attorney, Agent, or Firm* — Westerman, Hattori, Daniels & Adrian, LLP

(57) ABSTRACT

In an information access system, a reader/writer device encrypts, with a first encryption key, an information request and a second encryption key to thereby generate first encrypted data, and encrypts the information request with the second encryption key to thereby generate second encrypted data, and transmits cyclically an information request signal that alternately carries the first encrypted data and the second encrypted data. An active contactless information storage device receives the information request signal and decrypts the encrypted data carried by the information request signal with one encryption key stored in its memory. When the second encryption key different from the one encryption key is contained in the decrypted data, the information storage device rewrites the one encryption key with the second encryption key.

12 Claims, 16 Drawing Sheets

W/R 304

START

S614: ENCRYPT COMMAND WITH ENCRYPT KET Ke1=Ke2, TRANSMIT IT, AND RECEIVE AND DECRYPT RESPONSE (S414-S418, S422-S436 IN FIG. 8)

S616: IS NEW DECRYPT KEY RECEIVED? — NO / YES

S618: SET NEW ENCRYPT KEY TO ENCRYPT KEY Ke2

S620: ENCRYPT COMMAND WITH DIFFERENT ENCRYPT KEYS Ke1, Ke2, ENCRYPT AND TRANSMIT COMMAND, RECEIVE AND DECRYPT RESPONSE. (S414-S418, S422-S436 IN FIG .8)

S622: IS DECRYPT KEY Ke2 SET TO ALL OF RF ID TAGS? — NO / YES

S624: SET ENCRYPT KEY AS Ke1=Ke2

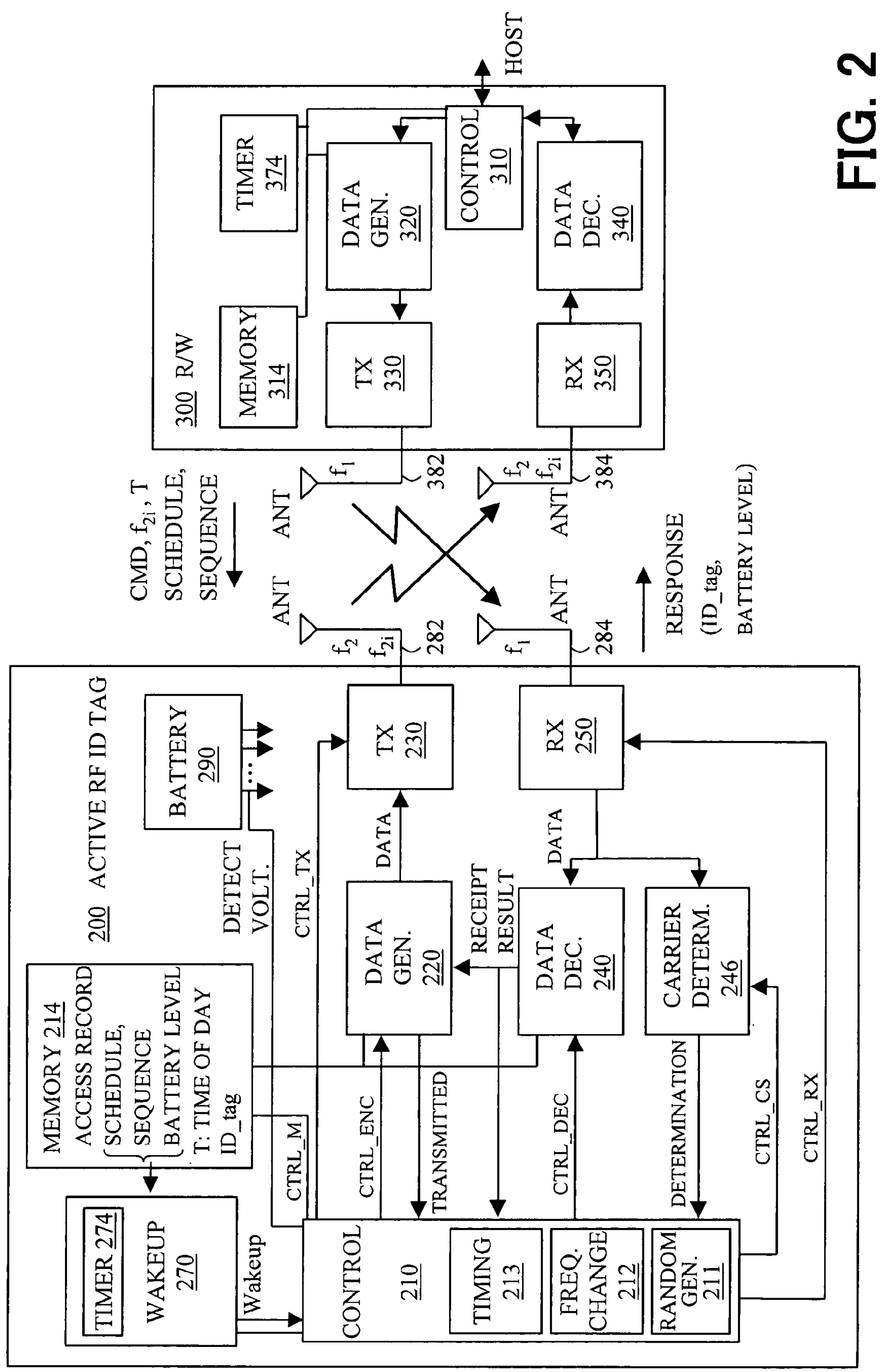

FIG. 2
HOST
300 R/W
TIMER 374
MEMORY 314
CONTROL 310
DATA GEN. 320
DATA DEC. 340
TX 330
RX 350
382
384
ANT
f1
f2
f2i
CMD, f2i, T
SCHEDULE,
SEQUENCE
RESPONSE
(ID_tag,
BATTERY LEVEL)
282
284
200 ACTIVE RF ID TAG
BATTERY 290
TX 230
RX 250
DATA
DETECT VOLT.
CTRL_TX
DATA GEN. 220
RECEIPT RESULT
DATA DEC. 240
CARRIER DETERM. 246
MEMORY 214
ACCESS RECORD
SCHEDULE,
SEQUENCE
BATTERY LEVEL
T: TIME OF DAY
ID_tag
CTRL_M
CTRL_ENC
TRANSMITTED
CTRL_DEC
DETERMINATION
CTRL_CS
CTRL_RX
TIMER 274
WAKEUP 270
Wakeup
CONTROL 210
TIMING 213
FREQ. CHANGE 212
RANDOM GEN. 211

R/W 300
TX 330
STATE
TRANSMIT CMD
42

RX 350
STATE
RECEIVE READY
46
48
RECEIVE READY
TIME [sec]

RF ID TAG 200
TX 230
RX 250
STATE
RECEIVE
f1
f2 or f2i
RECEIVE TRANSMIT
50
51
52
54
56
ND
DT
(s)

RF ID TAG APPROACHES R/W

R/W 302
TX 330
STATE
42
TRANSMIT CMD
0 1 2 3 4 5 6 7 8 (s)

STATE
RX 350
46
RECEIVE READY
48
RECEIVE READY
0 1 2 3 4 5 6 7 8 (s)
RECEIVE
TIME [sec]

RF ID TAG 202
TX 230
RX 250
STATE
$f_1$
$f_2$ or $f_{2i}$
RECEIVE TRANSMIT
$f_1$
NO TRANSMISSION
RECEIVE
50
51
52
53
54
55
56
0 1 2 3 4 5 6 7 8 (s)
ND ND ND ND DT ND ND DT ND
SUCCESSFUL AUTHENTICATION
UNSUCCESSFUL AUTHENTICATION
RF ID TAG APPROACHES R/W
RF ID TAG APPROACHES R/W

R/W 304
42
TRANSMIT CMD
TX 330 STATE
Ke1 [Ke2]
Ke2
1
2
3
(s)

46
48
STATE
RX 350
RECEIVE READY

RECEIVE
TIME [sec]
$f_1$
$f_2$ or $f_{2i}$
TRANSMIT
RF ID TAG 204
TX 230
RX 250
STATE
51
52
54
56
50
Ke1
Ke2

Ke1[Ke2]
DT
ND

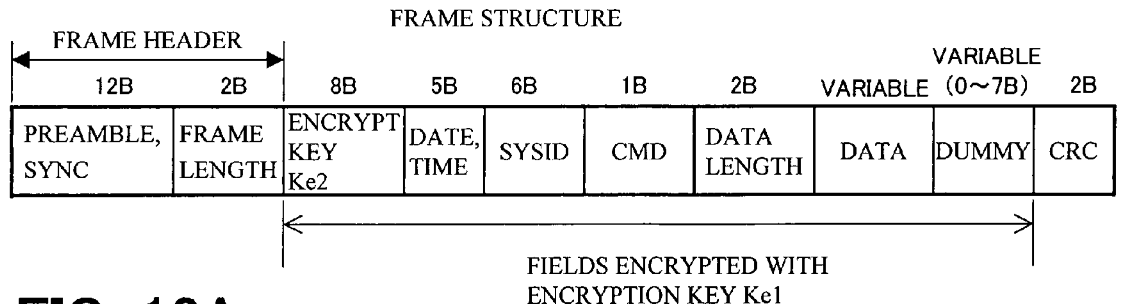
FIG. 12A
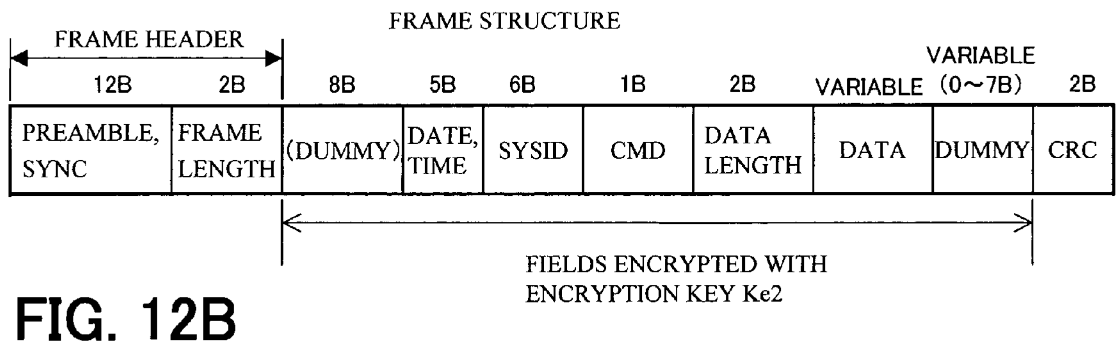
FIG. 12B
LIST OF TAG IDS
| TAG ID | ENCRYPTION KEY Ke1/Ke2 |
|---|---|
| 0001 | 1 |
| 0002 | 2 |
| 0003 | 2 |
| 0004 | 1 |
| 0005 | 1 |
| 0006 | 2 |
| 0007 | 1 |
| 0008 | 2 |
| ... | ... |
| 0099 | 2 |
FIG. 13

INFORMATION ACCESS SYSTEM, READER/WRITER DEVICE AND CONTACTLESS INFORMATION STORAGE DEVICE

FIELD OF THE INVENTION

The present invention relates generally to reading and writing information from and into an active-type contactless information storage device, and in particular to changing an encryption key in an active RFID tag.

BACKGROUND OF THE INVENTION

An RF ID tag with a battery power supply or of an active type, which is attached to a merchandise article or the like, or carried by a person, transmits an RF signal at a predetermined frequency that carries an ID and other information related to the article or the person, so that the RF signal is received and the information is read out by a reader device. The read-out information is further processed by a computer or the like, so that the distribution of the article or the action of the person is monitored and managed. The active-type RF ID tag with battery power supply has a larger communication range than a passive-type RF ID tag that receives power from a reader/writer device in a contactless manner, and hence is practical in use. However, the active-type RF ID tag transmits an RF signal in a fixed cycle, has a risk of being tracked by a third party, and hence has a problem in the security. To address this security problem, there has been developed an improved active-type RF ID tag that responds only to a tag ID request transmitted by the reader/writer device.

PCT International Publication WO 97/43740 published on Nov. 20, 1997 describes radio frequencies identification device which includes an integrated circuit including a receiver, a transmitter and a microprocessor. The receiver and transmitter together form an active transponder. The integrated circuit is preferably a monolithic single die integrated circuit including the receiver, the transmitter and the microprocessor. Because the device includes an active transponder, instead of a transponder which relies on magnetic coupling for power, the device has a much larger range.

Japanese Patent Application Publication JP 2000-113130-A published on Apr. 21, 2000 describes an IC tag detection system with low power consumption. This system includes a plurality of IC tags provided with different set times of day. Each IC tag includes a communication circuit, a control unit, a power source unit for supplying power from a battery to them, and time measuring means. Each IC tag performs transmission at each prescribed set time of day. This system also includes a detector for detecting the presence or absence of the IC tags based on the communication with them. The detector has a communication circuit, and determines the presence or absence of reception from them successively at the respective set times of day of the respective IC tags. Since the IC tag receives no inquiry from the detector, the IC tag can avoid useless reaction and battery consumption.

Japanese Patent Application Publication JP 2001-251210-A published on Sep. 14, 2001 (which corresponds to U.S. Pat. No. 6,922,402-B1) describes a method of locking a frequency in a transmitter at each of two nodes in a full duplex link, without using a separate reference oscillator in each node. The method provides locking of transmission frequencies of both nodes in a full duplex link at the same time by utilizing information of a received frequency to tune carrier frequencies of the transmitters. The offset of the carrier frequency of the fist transmitter is detected as the offset of a second corresponding receiver. The second receiver shifts the carrier frequency of the second transmitter, in response to the detected offset, to inform the first transmitter about the detected offset. The first receiver uses the detected offset to correct the carrier frequency of the first transmitter.

Japanese Patent Application Publication JP 2005-141529-A published on Jun. 2, 2005 describes an information communication system. In this system, an information processor includes a host and a reader/writer, and further includes an encryption/key storage unit and a data division/reconstitution unit for dividing data stored in a storage medium. The storage medium includes a plurality of RF ID devices which are independently driven. The information processor divides data stored in the storage medium, encrypts divided pieces of data with respective different encryption keys and stores these encrypted divided pieces of data in respective RF ID devices. This allows data stored in the storage devices to be confidential on a communication path.

U.S. Pat. No. 6,980,795-B1 issued on Dec. 27, 2005 (which corresponds to European Patent Application Publication EP 1104213-A2 and to Japanese Patent Application Publication JP 2001-189721-A) describes a wireless network with a cipher key change procedure. The wireless network employs a radio network controller and a plurality of assigned terminals which are provided for coding certain data to be transmitted over traffic and control channels and which are provided for changing the respective key necessary for the coding at certain instants. The radio network controller sends a message about a change of the key coded with an old cipher key to a terminal. The terminal responds with a message coded with a new cipher key as an acknowledgement for the new cipher key.

SUMMARY OF THE INVENTION

In accordance with an aspect of the present invention, an information access system is provided for accessing information stored in a contactless information storage device, and comprises: a reader/writer device connectable to an information processing apparatus, and having a first memory, a first control unit, a first encryption unit for encrypting request data containing an information request to thereby generate encrypted data, a first transmitter unit for transmitting cyclically an information request signal at a first frequency that carries the encrypted data, a first receiver unit adapted to be continuously ready to receive an RF signal at a second frequency different from the first frequency, and a first decryption unit for decrypting another encrypted data carried by an RF signal at the second frequency; and an active contactless information storage device having a second memory, a second control unit, a second receiver unit for sensing a carrier of an RF signal at the first frequency for detection, a second decryption unit for decrypting encrypted data carried by the information request signal at the first frequency to thereby reproduce the request data, a second encryption unit for encrypting, in response to the information request in the reproduced request data, response data containing an identification stored in the second memory and thereby generating response encrypted data, and a second transmitter unit for transmitting a response signal at the second frequency that carries the response encrypted data. In response to a request from the information processing apparatus, and under the control of the first control unit, the first encryption unit encrypts first data containing the information request and a second encryption key with a first encryption key stored in the first memory to thereby generate first encrypted data and encrypts second data containing the information request with the second encryption key stored in the first memory to thereby generate second encrypted data, and the first transmitter unit transmits cyclically the information request signal at the first frequency that carries the first encrypted data and the second encrypted data in a time division manner. Under the control of the second control unit, the second receiver unit senses a carrier of an RF signal at the first frequency in predetermined periods occurring in a predetermined cycle. When the second receiver unit senses and detects a carrier of an RF signal at the first frequency in the particular predetermined period, under the control of the second control unit, the second receiver unit further receives the information request signal at the first frequency, and the second decryption unit decrypts the encrypted data carried by the information request signal at the first frequency with one encryption key stored in the second memory to thereby reproduce the data. The one encryption key stored in the second memory is the first or second encryption key. In response to the information request contained in the data reproduced by the second decryption unit, the second encryption unit encrypts the response data with the one encryption key stored in the second memory to thereby generate the response encrypted data, and the second transmitter unit transmits the response signal at the second frequency that carries the response encrypted data. The first receiver unit receives the response signal at the second frequency, the first decryption unit decrypts the response encrypted data carried by the response signal at the second frequency with the corresponding first or second encryption key stored in the first memory to thereby reproduce the response data. When the second encryption key different from the one encryption key stored in the second memory is contained in the data reproduced by the second decryption unit, the second control unit sets the second encryption key as the one encryption key to be stored in the second memory.

The invention also relates to an active contactless information storage device for use in the information access system described above, and a method for accessing information in a contactless information storage device for use in the information access system described above.

BRIEF DESCRIPTION OF THE DRAWINGS

FIG. 2 shows the configurations of a further improved active-type RF ID tag as an active contactless information storage device and of a reader/writer device;

FIGS. 12A and 12B show examples of frames of data encrypted with the respective encryption/decryption keys;

FIG. 13 shows an example of a list of tag IDs of registered active RF ID tags that is stored in the memory of the reader/writer device;

DESCRIPTION OF THE PREFERRED EMBODIMENTS

The known improved active-type RF ID tag and the reader/writer device can perform encryption and decryption with one common encryption/decryption key Ke. Thus, for the purpose of changing the encryption/decryption key Ke to be used for them, all of the encryption/decryption keys Ke stored in the reader/writer device and all of the related active RF ID tags have to be changed simultaneously. Accordingly, once the encryption/decryption keys stored in the RF ID tags are started to be changed, the reader/writer devices and any of the RF ID tags cannot be used, until all of the RF ID tags are collected and the change is completed for all of them.

The inventors have recognized that the reader/writer device may transmit alternately a frame of data that is encrypted with the current encryption key and another frame of data that is encrypted with a new encryption key, so that the encryption keys of a plurality of the RF ID tags can be easily changed over time while the reader/writer device and the RF ID tags are continued to be used.

An object of the invention is to allow a reader/writer device to simultaneously access contactless information storage devices having respective different encryption keys.

Another object of the invention is to allow a reader/writer device to easily change an encryption key in a contactless information storage device.

According to the invention, a reader/writer device can simultaneously access contactless information storage devices having respective different encryption keys, and a reader/writer device can easily change an encryption key in a contactless information storage device.

Figure 1:
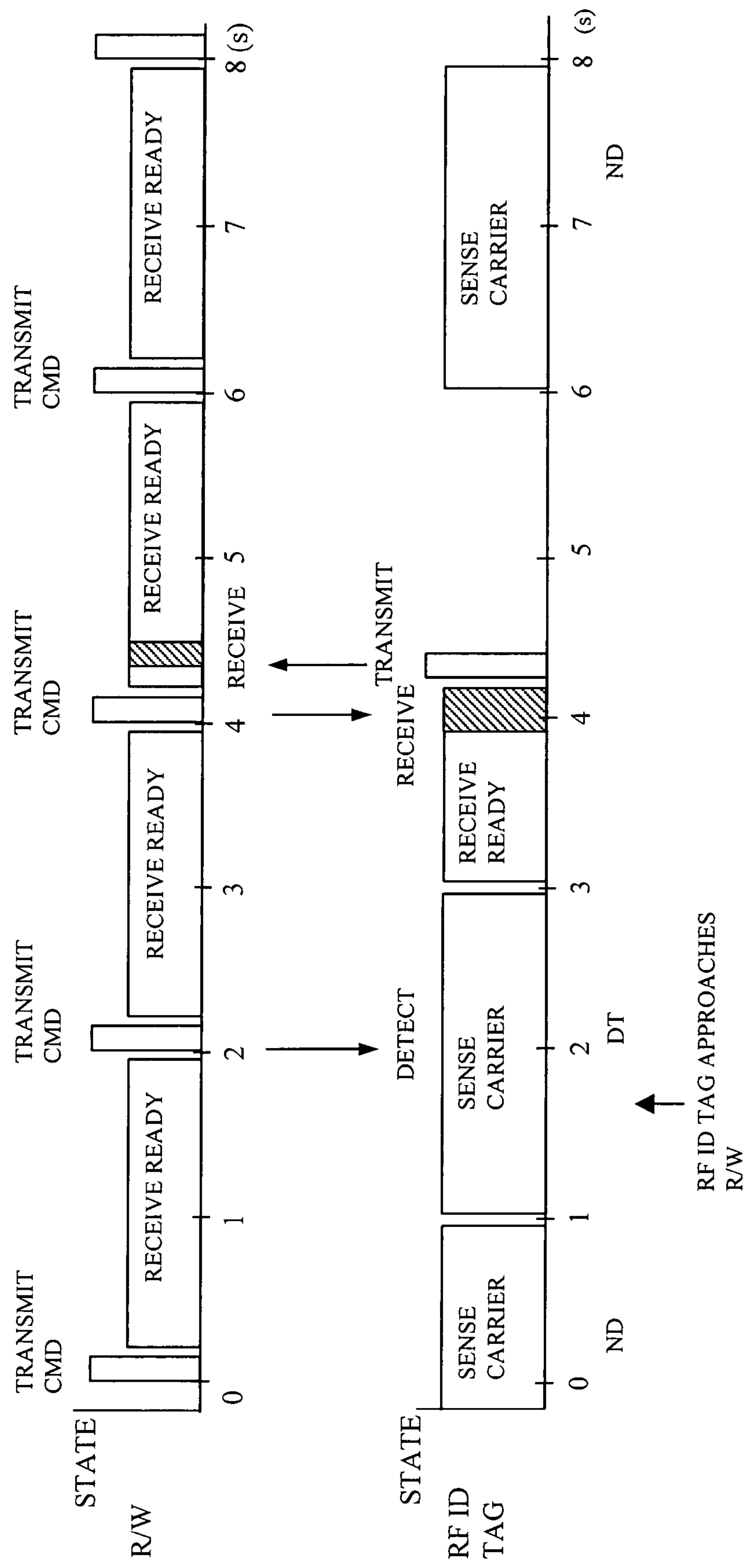
FIG. 1 is a time chart of a conventional improved active-type RF ID tag and of a reader/writer device (R/W) for reading the RF ID tag.

FIG. 1 is a time chart of a conventional improved active-type RF ID tag and of a reader/writer device (R/W) for reading the RF ID tag. The reader/writer device transmits a command (CMD) and receives a response from the RF ID on the same frequency channel in a time division manner. The reader/writer device transmits a command of requesting an ID in a fixed cycle for example, of two (2) seconds and in the duration, for example, of 100 ms. In the remaining time, the reader/writer device is in a state of receive ready.

In order for such a single reader/writer device to accommodate a plurality of RF ID tags, each RF ID tag is typically adapted to transmit a response signal to the reader/writer device at a random timing in response to the receipt of a single ID request transmitted by the reader/writer device, so as to avoid possible collision with another response signal. Each RF ID tag transmits a response signal to the reader/writer device in a time slot selected at random within a predetermined period of time subsequent to the receipt of the command, so that the probability of collision between the response signals is reduced. However, the reader/writer device is required to extend the duration of the state of receive ready. For example, if the duration for response transmission at a random timing from the RF ID tag is between zero (0) and 1.5 seconds or the like, the reader/writer device requires a duration of the receive ready state for 1.5 seconds or longer. This increases the cycle length of command transmission in the reader/writer device. On the other hand, in order to detect a request command transmitted by the reader/writer device, the RF ID tag senses, in a fixed cycle, a carrier, i.e., detects the intensity of a received RF signal. The RF ID tag is adapted to operate for reception and then operate for transmission, only when a carrier is detected. If the cycle length of transmission in the reader/writer device is two (2) seconds as an example, the carrier sensing duration also requires to have about two or more seconds in order to ensure the detection.

In general, when the RF ID tag receives no request from the reader/writer device, the RF ID tag is required to enter into a power down mode of operation in a duration intervening between adjacent carrier sensing durations so that the power consumption is reduced as much as possible and that the battery run time is extended. However, if about two seconds is reserved for the carrier sensing duration, little time remains for the power down duration, and hence it is difficult to significantly reduce the power consumption.

Thus, the active-type RF ID tag of FIG. 1 which is required to respond to a request command transmitted in a long cycle requires a long carrier sensing duration. This increases the power consumption, and hence reduces the battery run time.

The invention will be described in connection with non-limiting embodiments with reference to the accompanying drawings. Throughout the drawings, similar symbols and numerals indicate similar items and functions.

FIG. 2 shows the configurations of a further improved active-type RF ID tag 200 as an active contactless information storage device and of a reader/writer device 300. As an active contactless information storage device, a contactless IC card having a configuration similar to that of the active-type RF ID tag 200 may be used in place of the active-type RF ID tag 200.

The active-type RF ID tag 200 includes: a control unit 210; a memory 214; a data generation unit 220 for encoding data such as a tag ID (ID_tag) stored in the memory 214 in accordance with a predetermined encoding scheme to thereby generate encoded data; a transmitter unit (TX) 230 for modulating a carrier with the encoded data of a baseband received from the data generation unit 220, and then transmitting an RF signal at a frequency $f_2$ or RF signals at different frequencies $f_{2i}$ (i=1, 2, . . . , n); a receiver unit (RX) 250 for receiving and demodulating an RF signal at a frequency $f_1$, to thereby reproduce baseband encoded data, and then generating data indicative of the carrier intensity of the received RF signal; a data decoding unit 240 for decoding the encoded data received from the receiver unit 250 in accordance with the predetermined encoding scheme, to thereby generate decoded data; a carrier determination unit 246 for determining the presence or absence of a received RF signal carrier in accordance with the data indicative of the carrier intensity; a wakeup unit 270 for generating a wakeup signal in accordance with a time control sequence having been set up beforehand; a transmission antenna (ANT) 282 coupled to the transmitter unit 230; a receiving antenna (ANT) 284 coupled to the receiver unit 250; and a battery 290 for supplying power to these elements 210-270. The frequencies $f_1$ and $f_2$ may be 300 MHz and 301 MHz, respectively, for example. The frequencies $f_{2i}$ are 301 MHz, 302 MHz, . . . , 305 MHz, for example. The transmission output power of the transmitter unit (TX) 230 may be 1 mW for example. Alternatively, the antennas 282 and 284 may be composed of a single antenna.

The control unit 210 includes a random number generator 211 for generating a random number for selecting a time slot for transmission, a frequency changing unit 212 for changing the transmitting frequency $f_{2i}$, and a timing unit 213 for adjusting a timing for transmission.

The control unit 210 is always in an active state after power activation, and provides a memory control signal CTRL_M, a data generation control signal CTRL_ENC, a transmission control signal CTRL TX, a reception control signal CTRL RX, a data decode control signal CTRL_DEC, a carrier determination control signal CTRL_CS and a wakeup unit control signal to the memory 214, the data generation unit 220, the transmitter unit 230, the receiver unit 250, the data decoding unit 240, the carrier determination unit 246, and the wakeup unit 270, respectively. The control unit 210 may be a microprocessor or microcomputer that operates in accordance with a program stored in the memory 214.

The memory 214 stores information such as, the tag ID (ID_tag) of the RF ID tag 200, the current time-of-day information T, records of accesses performed by the reader/writer device 300, a control schedule and a time control sequence of the wakeup unit 270, the current remaining power level of the battery 290, a cycle Tcs of sensing a carrier, a time period of processing for reception, a cycle of transmission, and a time period of transmission. These pieces of information are stored and updated under the control of the control unit 210. The control unit 210 regularly or periodically detects the value of the supply voltage of the battery 290 to thereby determine the current remaining battery power level, and then stores information indicative of the remaining power level of the battery 290 into the memory 214.

The wakeup unit 270 includes a timer 274 for measuring time and thereby generating a time of day, and is always in an active state after the power activation of the RF ID tag 200. In accordance with the time of day of the timer 274 and with the control schedule and the time control sequence read out from the memory 214 and set up beforehand, the wakeup unit 270 provides a wakeup signal to the control unit 210 in a predetermined cycle Tcs for sensing a carrier, for example, of two seconds. When a control schedule and a time control sequence, the current time-of-day information T, and an instruction for correcting or updating the control schedule and the time control sequence are received as the received data from the reader/writer device 300, the control unit 210 corrects and updates the current time of day T, the control schedule and the time control sequence in the memory 214. The control unit 210 corrects the time of day of the timer 274 in accordance with the current time of day information T in the memory 214, and then writes and updates the current time of day T generated by the timer 274 in the memory 214.

The data generation unit 220 generates data in a predetermined format containing the tag ID (ID_tag) stored in the memory 214 and the like, then encodes the data in accordance with the predetermined encoding scheme, and then provides the data to the transmitter unit 230. The data may include the remaining battery power level and the access record. The data decoding unit 240 decodes the received encoded data in accordance with the predetermined encoding scheme, and then provides the decoded data to the data generation unit 220 and to the control unit 210. The carrier determination unit 246 receives, from the receiver unit 250, data indicative of the power intensity of the received RF signal carrier, thereby determines the presence or absence of a received carrier to provide the resultant determination to the control unit 210.

The reader/writer device 300 includes: a control unit 310 for transmitting and receiving data to and from a host computer (not shown); a memory 314; a data generation unit 320 for generating data in a predetermined format containing a command (CMD) and the like received from the control unit 310, then encoding the data in accordance with the predetermined encoding scheme, and thereby generating encoded data; a transmitter unit (TX) 330 for modulating the carrier with the baseband encoded data received from the data generation unit 320, and then transmitting an RF signal at a frequency $f_1$; a receiver unit (RX) 350 for receiving an RF signal at a frequency $f_2$ or RF signals at frequencies $f_{21}$-$f_{2n}$; a data decoding unit 340 for decoding the data received from the receiver unit 350 in accordance with the predetermined encoding scheme, thereby generating baseband decoded data, and then providing the decoded data to the control unit 310; a timer 374 for measuring time and thereby generating a time of day; a transmission antenna (ANT) 382 coupled to the transmitter unit 330; and a receiving antenna (ANT) 384 coupled to the receiver unit 350. The transmission output power of the transmitter unit (TX) 330 is 100 mW for example. Alternatively, the antennas 382 and 384 may be composed of a single antenna.

When the control unit 310 receives a command such as a tag ID or information request command (referred to simply as a tag ID request command hereinafter) from the host computer, it provides data containing the command to the data generation unit 320. The data may contain: the transmission frequency $f_2$ or $f_2$, to be used in the RF ID tag 200; the reference current time-of-day information T; and a control schedule and a time control sequence which are new or updated. The command may contain an instruction of correcting or updating the time of the timer 274, in addition to the current time-of-day information T. Further, the command may contain an instruction of correcting or updating the schedule or the sequence stored in the memory 214, in addition to the control schedule or the time control sequence which are new or updated. Similarly to the control unit 210, the control unit 310 may operate in accordance with a program which is stored in the memory 314.

Figures 3A, 3B, 3C:
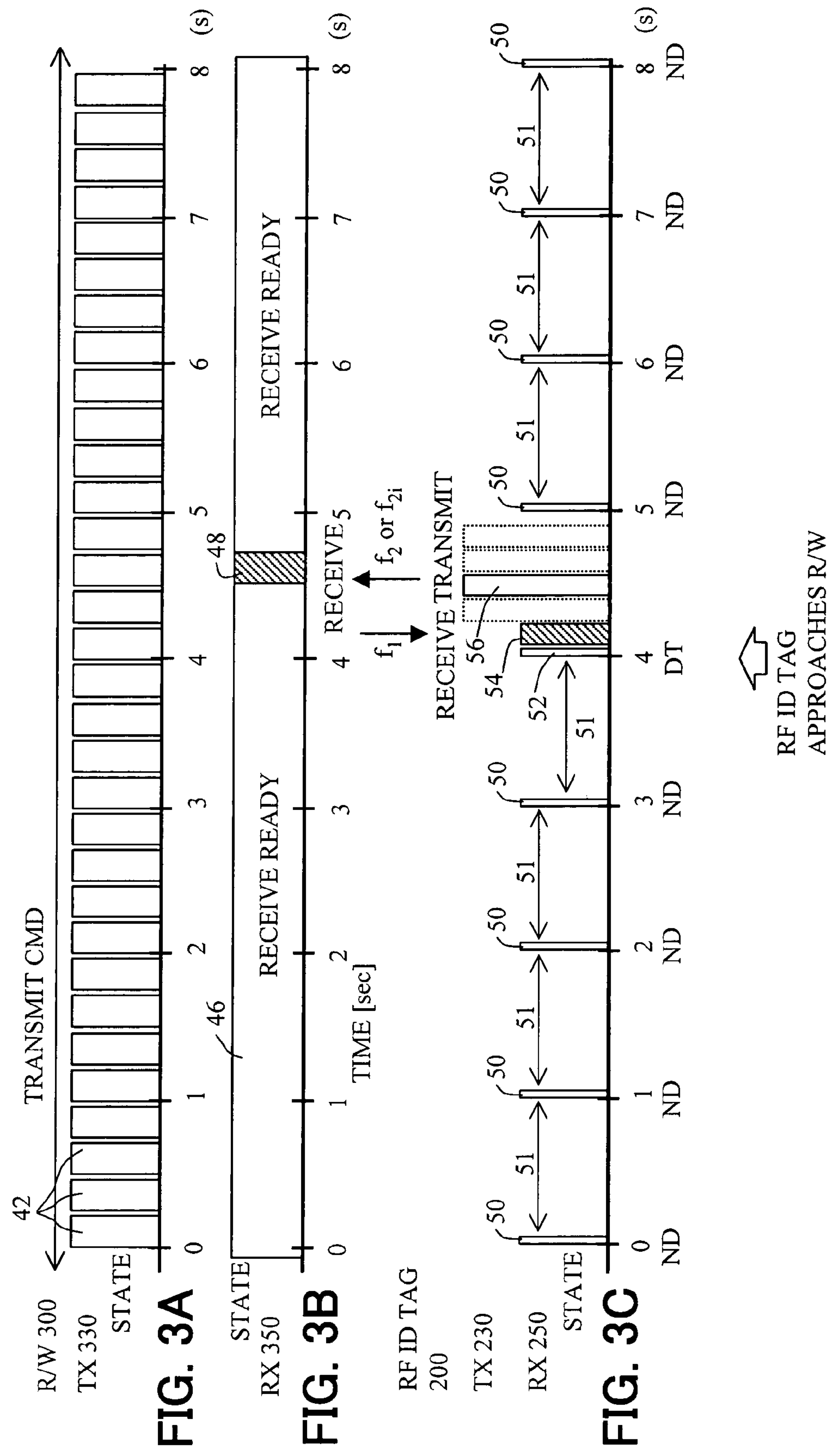
FIG. 3A shows a time chart of processing for transmission of an RF signal carrying a command transmitted from the reader/writer device.
FIG. 3B shows a time chart of a receive ready state and of processing for reception of a received RF signal in the reader/writer device.
FIG. 3C shows a time chart of carrier sensing, processing for reception of a received RF signal, and processing for transmission of an RF signal carrying a response, in the active-type RF ID tag.

FIG. 3A shows a time chart of processing for transmission 42 of an RF signal carrying a command transmitted from the reader/writer device 300. FIG. 3B shows a time chart of a receive ready state 46 and of processing for reception 48 of a received RF signal in the reader/writer device 300. FIG. 3C shows a time chart of carrier sensing 50 and 52, processing for reception 54 of a received RF signal, and processing for transmission 56 of an RF signal carrying a response, in the active-type RF ID tag 200.

Referring to FIG. 3A, the data generation unit 320 of the reader/writer device 300 generates data containing a tag ID request command for the RF ID tag received from the control unit 310, then encodes the data in accordance with the predetermined encoding scheme, and thereby generates encoded data. The transmitter unit 330 continually transmits the RF signal carrying the command in the successive time slots at short intervals in the processing for transmission 42.

Referring to FIG. 3C, in the active-type RF ID tag 200, in response to a wakeup signal from the wakeup unit 274, the control unit 210 enables the receiver unit 250 and the carrier determination unit 246 in the periods for carrier sensing 50 and 52 with a predetermined duration, for example of approximately 1-10 ms, occurring in a fixed cycle Tcs, for example of two seconds. This causes the receiver unit 250 to enter into a receive ready state. Then the enabled carrier determination unit 246 determines the presence or absence of a received carrier, in accordance with the data received from the receiver unit 250 indicating the power intensity of the received RF signal carrier. When the RF ID tag 200 is not located near the reader/writer device 300, the carrier determination unit 246 detects no carrier (ND), and hence determines the absence of a carrier. In a period of time 51 intervening between two adjacent carrier sensing periods 50, the RF ID tag 200 enters into a sleep mode of operation, during which only the control unit 210 and the wakeup unit 270 are enabled or powered on, while the other elements 214-250 are disabled or powered down. The time length of the sleep period of time 51 may be shorter than the length of time between the ending time of a carrier sensing period 50 and the starting time of the next carrier sensing period 50.

When the RF ID tag 200 approaches the reader/writer device 300 so that the receiver unit 250 of the RF ID tag 200 receives an RF signal, the carrier determination unit 246 detects the carrier of the RF signal (DT) in the period for carrier sensing 52, and hence determines the presence of a carrier. In response to the resultant determination of the presence of a carrier, the receiver unit 250 and the data decoding unit 240 are enabled in the time period for the subsequent processing for reception 54 with a predetermined duration, for example, of 100 ms. Then, the enabled receiver unit 250 receives and demodulates the RF signal to thereby reproduce encoded data containing a command. The enabled data decoding unit 240 decodes the data in accordance with the predetermined encoding scheme, then obtains the command from the data, and then provides the command to the control unit 210. In response to the command, the control unit 210 enables the data generation unit 220 and the transmitter unit 230 in a time period or slot of processing for transmission 56 selected at random within a predetermined period of time, each time slot having a predetermined duration, for example, of 100 ms. The enabled data generation unit 220 generates data containing the tag ID (ID_tag) and other required information retrieved from the memory 214, and then encodes the data in accordance with the predetermined encoding scheme. The other required information may include information, such as commodity contents of a package and the number of the contents, a sender, transportation, a route and a destination. The enabled transmitter unit 230 modulates the carrier with the response data containing the tag ID, and then transmits the RF signal.

Referring to FIG. 3B, the receiver unit 350 of the reader/writer device 300 is always in the receive ready state 46. When the RF ID tag 200 approaches the reader/writer device 300 and the receiver unit 350 receives an RF signal, the receiver unit 350 demodulates the received RF signal in the time period of processing for reception 48 and generates encoded data. The data decoding unit 350 decodes the encoded data in accordance with the predetermined encoding scheme, then reproduces the response data containing the tag ID, and then provides the reproduced tag ID to the control unit 310. The control unit 310 provides the tag ID to the host computer. The host computer processes the tag ID to use for monitoring and managing the article distribution or the persons.

In general, the total time during which the RF ID tag 200 is not located near the reader/writer device 300 is significantly long. Thus, the active-type RF ID tag 200 is in a sleep mode of operation for the most time. This significantly reduces the power consumption of the active-type RF ID tag 200, and hence significantly increases the run time of the battery 290.

Figure 4:
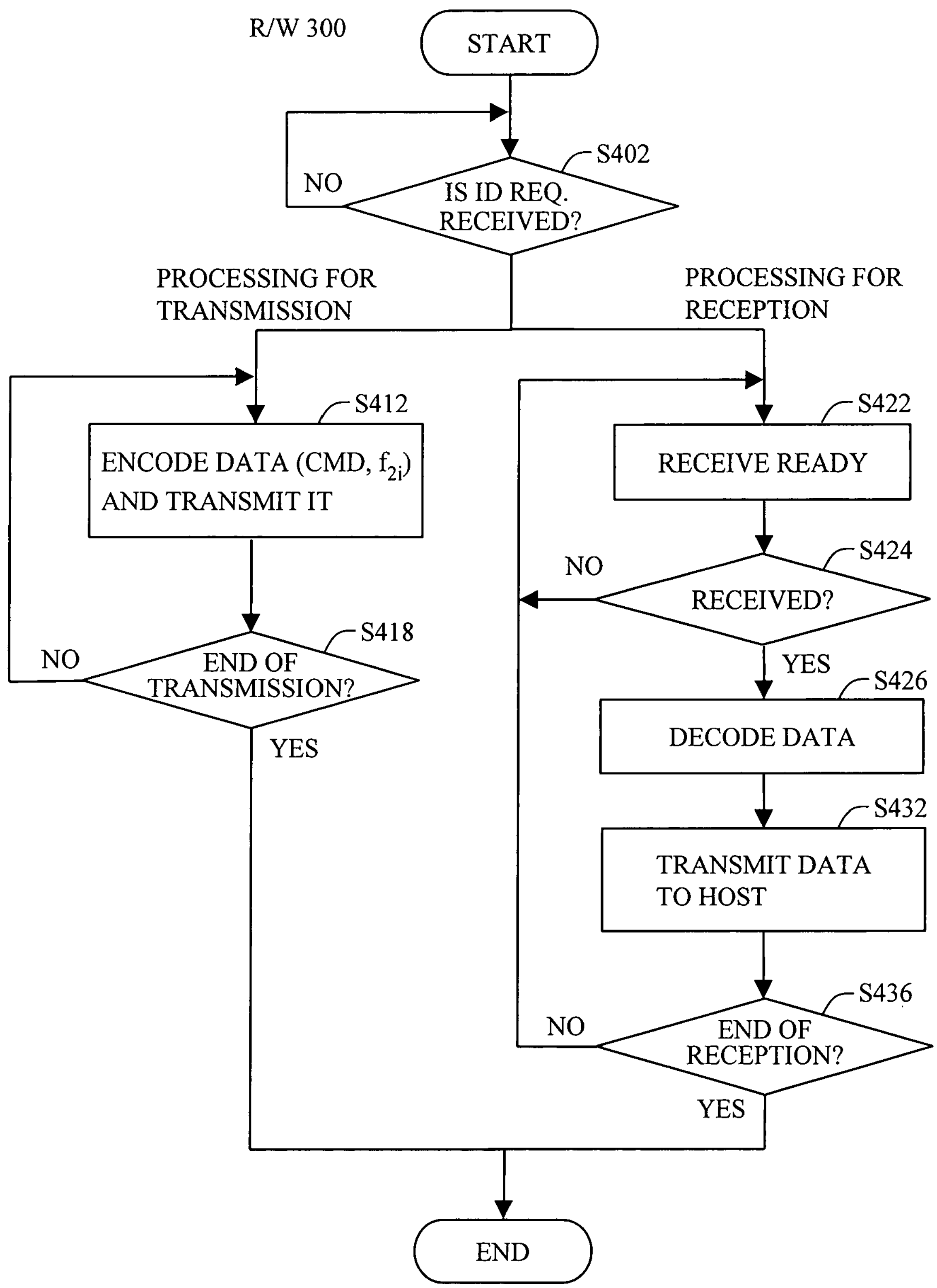
FIG. 4 shows a flow chart for the processing performed by the reader/writer device.
Figure 5A:
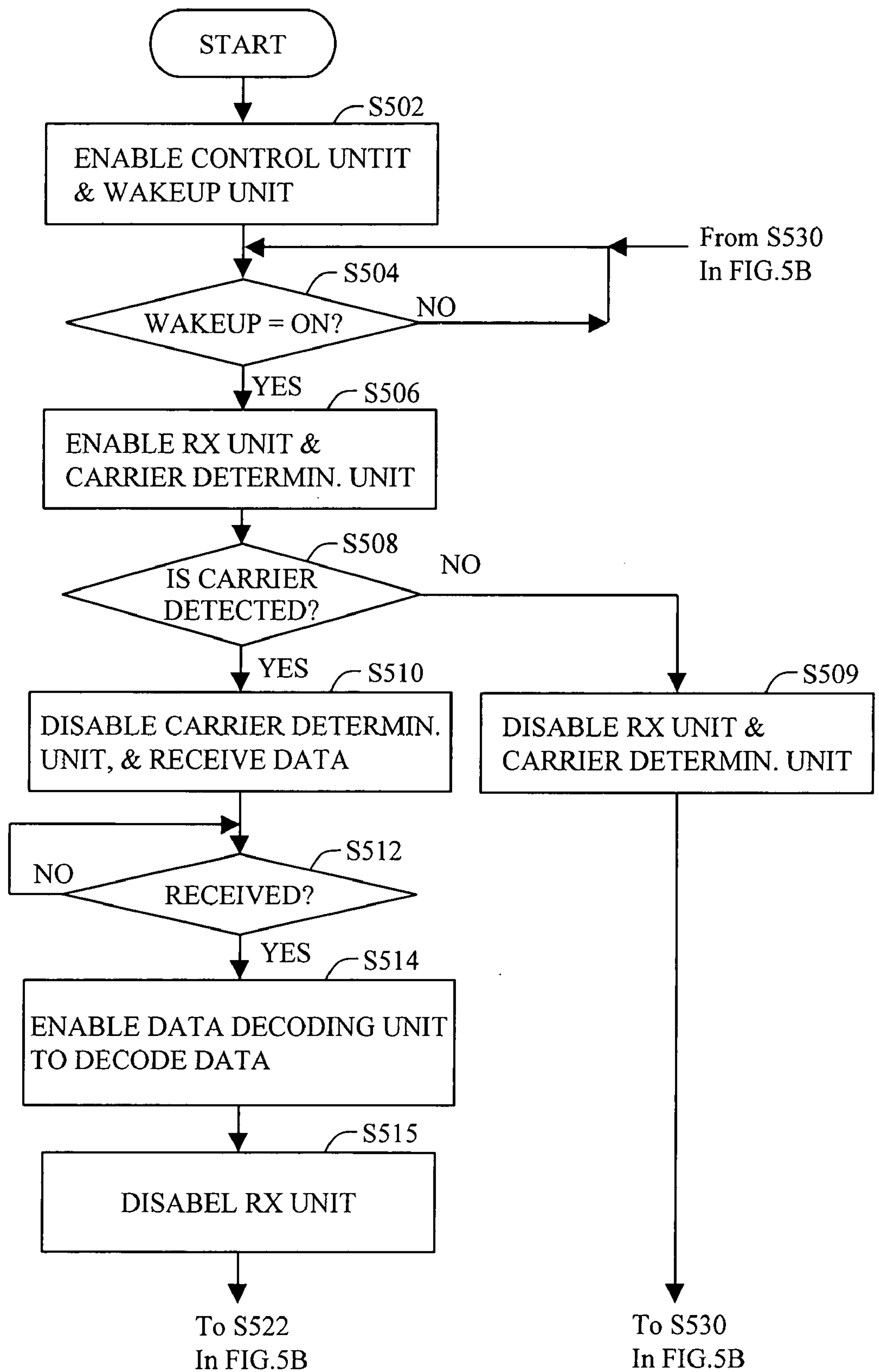
FIGS. 5A and 5B show a flow chart for the processing performed by the active-type RF ID tag.
Figure 5B:
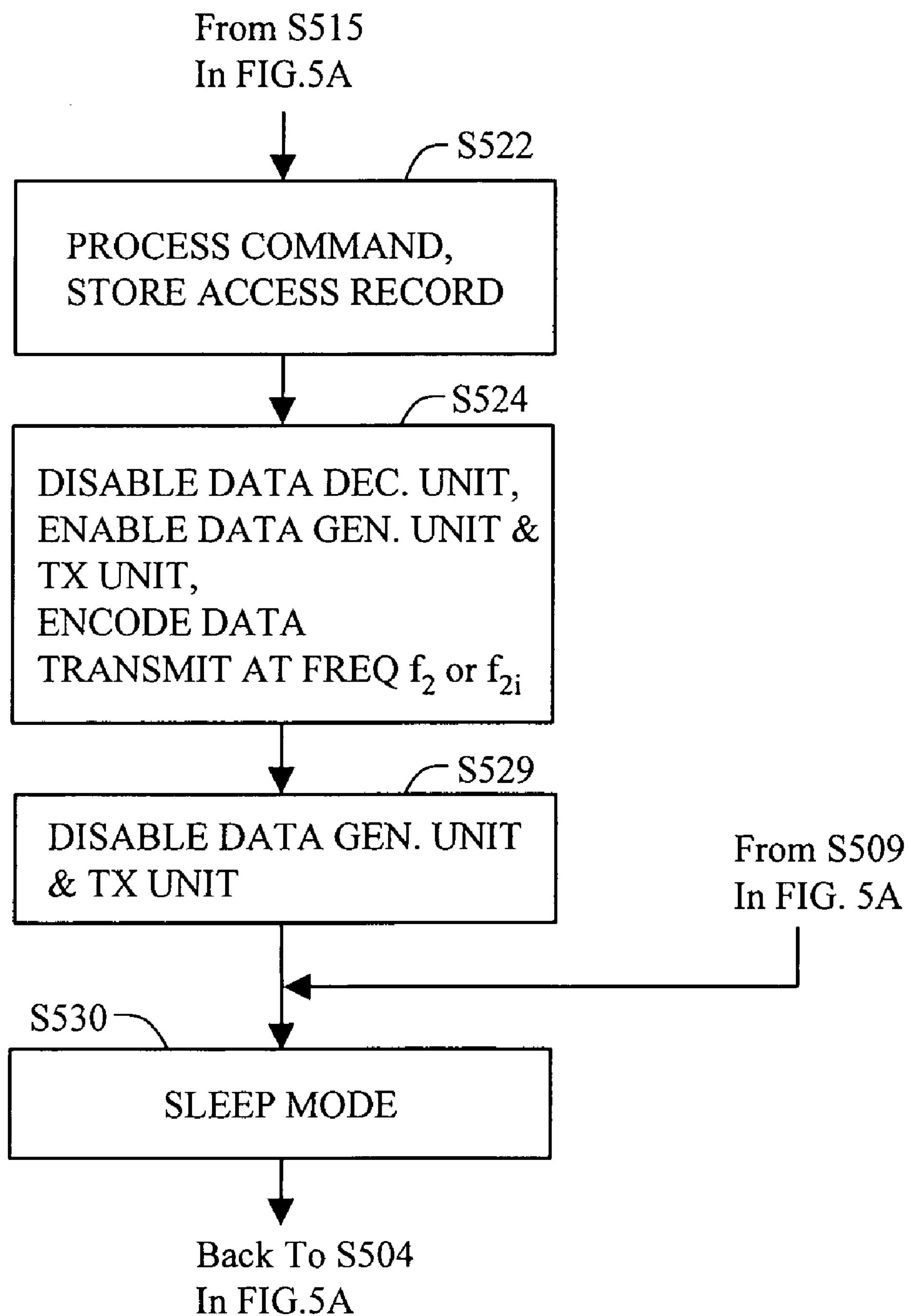

FIG. 4 shows a flow chart for the processing performed by the reader/writer device 300. FIGS. 5A and 5B show a flow chart for the processing performed by the active-type RF ID tag 200.

Referring to FIG. 4, at Step 402, the control unit 310 of the reader/writer device 300 determines whether a tag ID request command has been received from the host computer. The Step 402 is repeated until a request for the tag ID is detected. When a request for the tag ID is detected, the procedure proceeds to Step 412 for processing for transmission and to Step 422 for processing for reception.

At Step 412, the control unit 310 provides the ID request command and the related information to the data generation unit 320. The data generation unit 320 generates data containing the ID request command, and then encodes the generated data in accordance with a predetermined encoding scheme such as the NRZ (Non-Return-to-Zero) encoding system or the Manchester encoding system. The transmitter unit 330 modulates the carrier with the encoded data in the time slot of processing for transmission 42 of FIG. 3A, and then transmits the RF signal at a frequency $f_1$. The control unit 310 may incorporate, into the ID request command, data for specifying the transmission frequency $f_2$ or the variable transmission frequencies $f_{21}$ used for a response to the ID request command; data indicative of time of day or time slots to be used for the variable transmission frequencies $f_{21}$; data indicative of the current time of day T; and a control schedule and a time control sequence.

The reader/writer device 300 may change the frequencies $f_{21}$ in the order in a time division manner, selecting one of the frequencies for every set of commands in respective transmission cycles $t_{RW-CY}$, the number of which corresponds to the time length of one or more cycles of sensing a carrier. This reduces the probability of collision between response RF signals transmitted from a plurality of RF ID tags which simultaneously approach to it. This increases the number of RF ID tags that the reader/writer device 300 can simultaneously identify.

At Step 418, the control unit 210 determines whether the processing for data transmission is to be terminated. If it is determined that the data transmission is terminated, the procedure exits this routine. If it is determined that the processing for data transmission is to be continued, the procedure returns to Step 412. In FIG. 3A, the data transmission is repeated and continued.

Referring to FIG. 5A, at Step 502, when the RF ID tag 200 is activated, the control unit 210 and the wakeup unit 270 are enabled. Once the RF ID tag 200 is activated, the control unit 210 and the wakeup unit 270 are always enabled, and hence in an active state. In accordance with the timer 274 and with the time control sequence, the wakeup unit 270 provides the control unit 210 with a wakeup signal indicative of the timing for carrier sensing of a received RF signal in a predetermined cycle Tcs. At Step 504, the control unit 210 determines whether the wakeup signal received from the wakeup unit 270 indicates an ON state. The control unit 210 repeats the Step 504 until the wakeup signal goes to the ON state.

If it is determined at Step 504 that the wakeup signal indicates the ON state, then the control unit 210 at Step 506 enables the receiver unit 250 and the carrier determination unit 246 for a short duration, for example, of approximately 1-10 ms. Then, the enabled receiver unit 250 enters into the state of being ready to receive an RF signal. In accordance with the data received from the receiver unit 250 that is indicative of the received carrier power, the enabled carrier determination unit 246 determines the presence or absence of a received RF signal carrier, and then provides the resultant determination to the control unit 210. At Step 508, in accordance with the resultant determination, the control unit 210 determines whether a carrier is detected. If it is determined that no carrier is detected, the control unit 210 at Step 509 disables the receiver unit 250 and carrier determination unit 246. After that, the procedure proceeds to Step 530.

If it is determined at Step 508 that a carrier is detected, then the control unit 210 at Step 510 disables carrier determination unit 246 and maintains to enable the receiver unit 250 in a further predetermined duration, for example of 100-200 ms, to receive an RF signal at a frequency $f_1$ carrying a command from the reader/writer device 300 (reception 54 in FIG. 3C), and then demodulates the received RF signal. At Step 512, the control unit 210 determines whether the receiver unit 250 has received the RF signal. The Step 512 is repeated until the reception of the RF signal is completed.

If it is determined at Step 512 that the RF signal has been received, then, the control unit 210 at Step 514 enables the data decoding unit 240, while the enabled data decoding unit 240 receives the received data from the receiver unit 250 under the control of the control unit 210, and then decodes the data in accordance with the predetermined encoding scheme. At Step 515, the control unit 210 disables the receiver unit 250.

Referring to FIG. 5B, at Step 522, the control unit 210 receives the decoded data containing the ID request command from the data decoding unit 240, then processes the received command contained in the decoded data, and then stores into the memory 214 the record of access performed by the reader/writer device 300. When a time correction command and the current time-of-day information T are contained in the received data, the control unit 210 corrects or updates the time of the timer 274 of the wakeup unit 270 into the time T.

At Step 524, the control unit 210 disables the data decoding unit 240, and in accordance with the ID request command, enables the data generation unit 220 and the transmitter unit 230 in a time slot selected in accordance with a random number from a predetermined number of time slots (e.g., five time slots each having a width of 100 ms) within the predetermined duration (e.g., 500 ms). Such a random number is generated by the random number generator unit 211. This selected time slot corresponds to the time period of the processing for transmission 56 of FIG. 3C. In accordance with the predetermined encoding scheme, the enabled data generation unit 220 encodes the data containing the tag ID (ID_tag) of the RF ID tag 200 read out from the memory 214, and then provides the data to the transmitter unit 230. The enabled transmitter unit 230 modulates the carrier with the data containing the tag ID, and then transmits via the antenna 284 an RF signal or RF signals at the predetermined frequency $f_2$ or specified frequency $f_{21}$. The frequency $f_{21}$ is changed by the frequency changing unit 212 of the control unit 210. The timing unit 213 adjusts a plurality of successive cycle time slots to occur in a predetermined cycle.

At Step 529, the control unit 210 disables the data generation unit 220 and the transmitter unit 230. At Step 530, the control unit 210 causes the RF ID tag 200 to enter into the sleep mode of operation. In the sleep mode, basically, the control unit 210 and the wakeup unit 270 solely are maintained in the enabled state, while the other elements 214-250 are disabled.

Referring back to FIG. 4, at Step 422, the control unit 310 enables the receiver unit 350 to enter into the receive ready state. The receiver unit 350 waits for the reception of an RF signal at a frequency $f_2$ (receive ready 46), and then receives an RF signal (processing for reception 48). At Step 424, the control unit 310 determines whether the receiver unit 350 has received the RF signal. The Step 424 is repeated until the reception is completed. If it is determined that the RF signal has been received, the receiver unit 350 at Step 426 provides the received data to the data decoding unit 340. The data decoding unit 340 decodes the received data in accordance with the predetermined encoding scheme to thereby reproduce the response data, and then provides notification of the data reception and the response data to the control unit 310.

At Step 432, the control unit 310 transmits the decoded data to the host computer. At Step 436, the control unit 310 determines whether the data receive ready state is to be terminated. If it is determined that the data receive ready state is to be terminated, the procedure exits this routine. If it is determined that the data receive ready state is to be continued, the procedure returns to Step 422. In FIG. 3B, the data receive ready state is repeated and continued.

Thus, the reader/writer device 300 performs transmission cyclically at sufficiently short intervals, and is always in the receive ready state. This reduces significantly the carrier sensing time of the RF ID tag 200. Thus, when the transmission and reception take place only several times a day, for example, for entry and exit control, the most operating time is used for carrier sensing, and hence the entire power consumption of the RF ID tag 200 is reduced significantly.

In a control schedule stored in the memory 214, the holidays and a period of time between a predetermined time point and another predetermined time point in the night-time (e.g., 6:00 pm to 6:00 am) of the weekdays may be specified, while a period of time between a predetermined time point and another predetermined time point in the daytime (e.g., 6:00 am to 6:00 pm) of the weekdays may be specified. In this case, the wakeup unit 270 generates no wakeup signal on the holidays and in the night-time, i.e., the RF ID tag 200 is in a deeper sleep mode of operation, and does not perform carrier sensing at all. In contrast, it performs carrier sensing in a predetermined cycle (e.g., of one second) in the daytime of the weekdays.

Under the control of the control unit 210, the wakeup unit 270 may generate a wakeup signal depending on the remaining power level of the battery 290 stored in the memory 214. In this case, when the remaining battery power level is sufficient, carrier sensing may be performed in a relatively short cycle (e.g., of one second), while, when the remaining battery power level goes below a threshold, carrier sensing may be performed in a relatively long cycle (e.g., of two seconds). Further, data representative of the remaining battery power level may be incorporated into the response data of the RF ID tag 200, and then provided to the host computer via the reader/writer device 300, so that the host computer displays a warning of battery run-out to a user.

When the records of accesses performed by the reader/writer devices are stored as a log of accesses in the memory 214 as described above, even an unauthorized access performed by a reader/writer device other than the reader/writer device 300 can be recorded as the log. Thus, when the log of accesses is read by the reader/writer device 300 and then analyzed by the host computer, the unauthorized access can be recognized.

Figure 6:
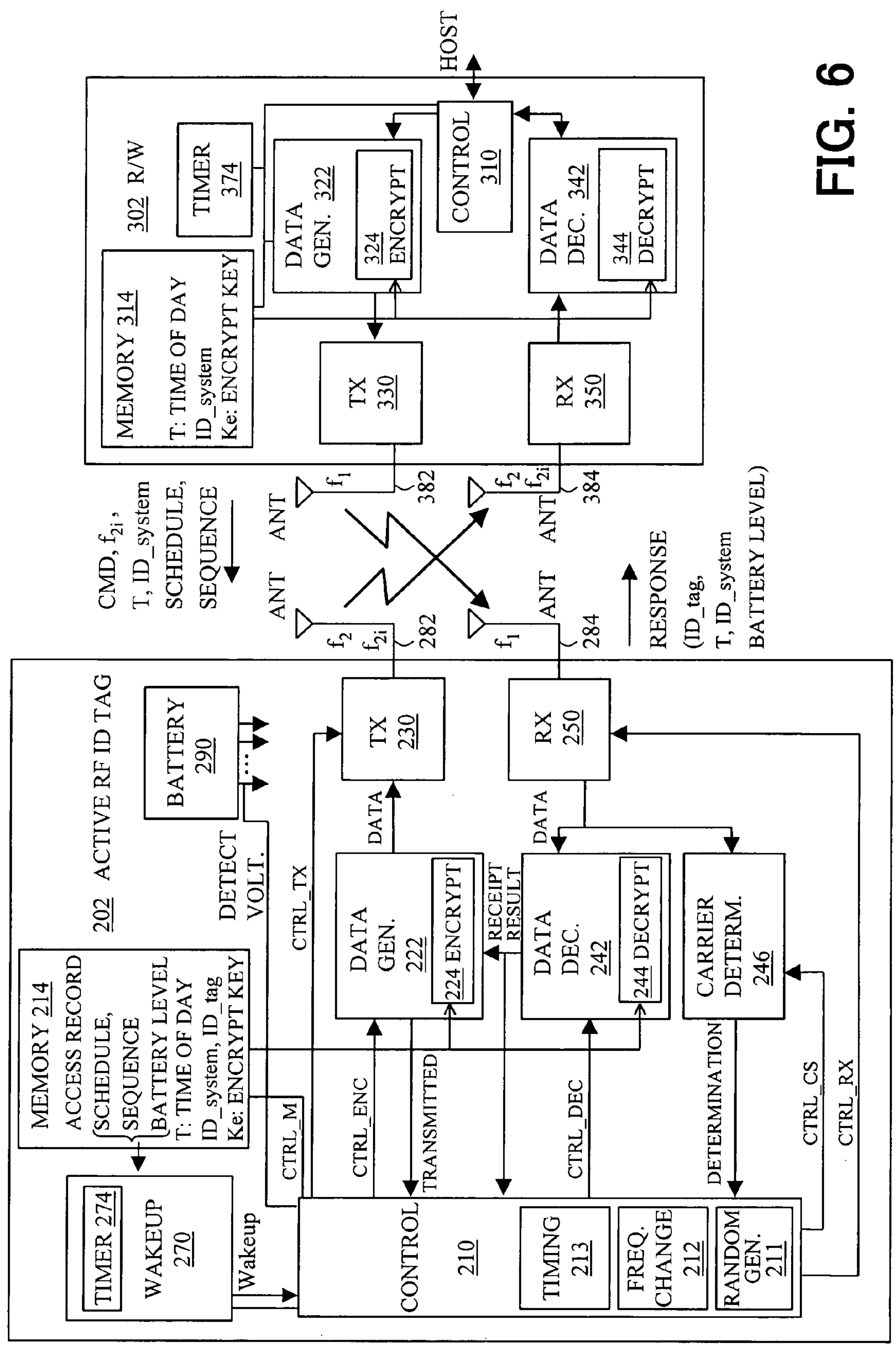
FIG. 6 shows modification of the configurations of FIG. 2, and illustrates the configurations of a more secure active-type RF ID tag and of a reader/writer device.

FIG. 6 shows modification of the configurations of FIG. 2, and illustrates the configurations of a more secure active-type RF ID tag 202 and of a reader/writer device 302. In these configurations, the data transmitted between the RF ID tag 202 and the reader/writer device 302 is encrypted, and the received data is decrypted to be used for authentication.

The RF ID tag 202 includes a data generation unit 222 in place of the data generation unit 220 in the RF ID tag 200 of FIG. 2, and includes a data decoding unit 242 in place of the data decoding unit 240 of FIG. 2. In addition to the tag ID (ID_tag), the memory 214 of the RF ID tag 202 stores the current time-of-day information T for authentication, a system ID (ID_system) for authentication, and an encryption/decryption key Ke. The memory 214 provides these pieces of information to the data generation unit 222 and the data decoding unit 242. The current time-of-day information T for authentication, the system ID for authentication, and the encryption/decryption key Ke described here are transmitted to the RF ID tag 202 by the reader/writer device 302 beforehand, and then written into the memory 214 by the control unit 210 beforehand. The data generation unit 222 includes an encryption unit 224 for encrypting the data to be transmitted, with the encryption key Ke stored in the memory 214 in accordance with a predetermined cryptosystem. The data decoding unit 242 includes a decryption unit 244 for decrypting the received data with the encryption/decryption key Ke in accordance with the predetermined cryptosystem. The other elements in the configuration of the RF ID tag 202 are similar to those of the RF ID tag 200, and hence are not described again. The system ID indicates a common ID shared by the same group consisting of the reader/writer device 302 and a plurality of RF ID tags including the RF ID tag 202. The common key cryptosystem is employed as the predetermined cryptosystem herein. Alternatively, the public key cryptosystem may be employed.

The reader/writer device 302 includes a data generation unit 322 in place of the data generation unit 320 in the reader/writer device 300 of FIG. 2, and includes a data decoding unit 342 in place of the data decoding unit 340 of FIG. 2. The memory 314 of the reader/writer device 302 stores the current time-of-day information T for authentication, the system ID (ID_system) for authentication, and an encryption/decryption key Ke. The data generation unit 324 includes an encryption unit 322 for encrypting the data to be transmitted, with the encryption key Ke stored in the memory 314 in accordance with the predetermined cryptosystem. The data decoding unit 342 includes a decryption unit 344 for decrypting the received data with the encryption/decryption key Ke in accordance with the predetermined cryptosystem. The other elements in the configuration of the reader/writer device 302 are similar to those of the reader/writer device 300, and hence are not described again.

Figures 7A, 7B, 7C:
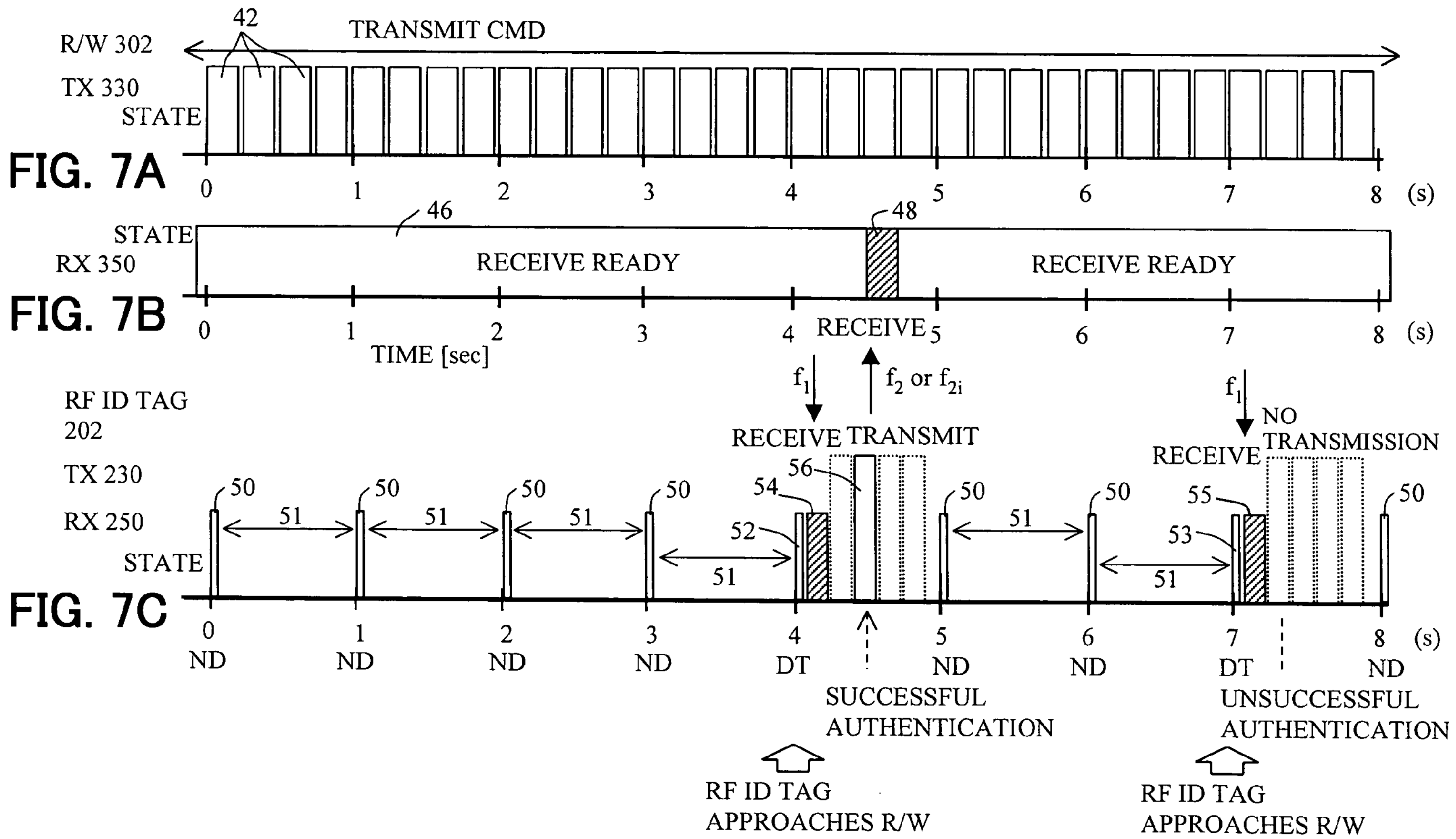
FIG. 7A shows a time chart of processing for transmission for an RF signal carrying a command (CMD) transmitted from the reader/writer device.
FIG. 7B shows a time chart of a receive ready state and of processing for reception of a received RF signal in the reader/writer device.
FIG. 7C shows a time chart of carrier sensing, processing for reception of received RF signals, and processing for transmission of an RF signal carrying a response in the case of successful authentication, in the active-type RF ID tag.

FIG. 7A shows a time chart of processing for transmission 42 for an RF signal carrying a tag ID request command (CMD) transmitted from the reader/writer device 302. FIG. 7B shows a time chart of a receive ready state 46 and of processing for reception 48 of a received RF signal in the reader/writer device 302. FIG. 7C shows a time chart of carrier sensing 50, 52 and 53, processing for reception 54 and 55 of received RF signals, and processing for transmission 56 of an RF signal carrying a response in the case of successful authentication, in the active-type RF ID tag 202.

Referring to FIG. 7A, the data generation unit 322 of the reader/writer device 302 generates data containing a tag ID request command for the RF ID tag that is received from the control unit 310, and encodes the data in accordance with the predetermined encoding scheme to thereby generate encoded encrypted data. The other transmission operation of the reader/writer device 302 is similar to that of the reader/writer device 300 of FIG. 3A.

Referring to FIG. 7C, in the active-type RF ID tag 202, the operations of the receiver unit 250 and carrier determination unit 246 are similar to those shown in FIG. 3C. Thus, in response to a wakeup signal from the wakeup unit 274, the receiver unit 250 and the carrier determination unit 246 are enabled by the control unit 210 in the periods for carrier sensing 50, 52 and 53 with the predetermined duration occurring in the fixed cycle, so that the enabled receiver unit 250 enters into a receive ready state.

In response to the resultant determination of the presence of a carrier (DT) made by carrier determination unit 246, the receiver unit 250 and the data decoding unit 242 are enabled in a predetermined time period for the subsequent processing for reception 54 and 55 with the predetermined duration. The enabled receiver unit 250 receives and demodulates the RF signal, to thereby reproduce encoded encrypted data containing the command. The enabled data decoding unit 242 decodes the data in accordance with the predetermined encoding scheme, then decrypts the encrypted data with the encryption/decryption key Ke in accordance with the predetermined cryptosystem to thereby reproduce the command, and then provides the command to the control unit 210. In response to reception of the command, the control unit 210 authenticates the reader/writer device 302 in accordance with the time-of-day information T and the system ID contained in the command.

When the authentication has been successful, the data generation unit 222 and the transmitter unit 230 are enabled in a time slot of processing for transmission 56 selected at random within a predetermined period of time, each time slot having a predetermined duration. The data generation unit 222 encrypts data containing the tag ID (ID_tag), the time-of-day information T, and the system ID (ID_system) retrieved from the memory 214, with the encryption key Ke in accordance with the predetermined cryptosystem, and then encodes the encrypted data in accordance with the predetermined encoding scheme. The transmitter unit 230 modulates the carrier with the encrypted response data containing the tag ID, and then transmits the RF signal. When the authentication has been unsuccessful, the processing is terminated without generating or transmitting the data.

Referring to FIG. 7B, the receiver unit 350 of the reader/writer device 302 is always in the receive ready state 46. When the RF ID tag 202 approaches the reader/writer device so that the receiver unit 350 receives an RF signal, the receiver unit 350 demodulates the received RF signal in the time period of processing for reception 48, and then reproduces encoded encrypted data. The data decoding unit 342 decodes the encoded encrypted data in accordance with the predetermined encoding scheme, then decrypts the decoded encrypted data with the encryption/decryption key Ke in accordance with the predetermined cryptosystem to thereby reproduce the response data containing the tag ID, and then provides the reproduced response to the control unit 310. In response to the received and reproduced response, the control unit 310 authenticates the RF ID tag 202 in accordance with the time-of-day information T and the system ID contained in the response, and then provides the tag ID and other information to the host computer.

In general, when the reader/writer device 302 and the RF ID tag 202 encrypt the data to be transmitted and perform mutual authentication in accordance with the time-of-day information T and the system ID as described above, the data transmitted by the reader/writer device 302 and the RF ID tag 202, which is intercepted by a third party, has little risk of being decrypted and used improperly. This enhances the security of the reader/writer device 302 and the RF ID tag 202.

Figure 8:
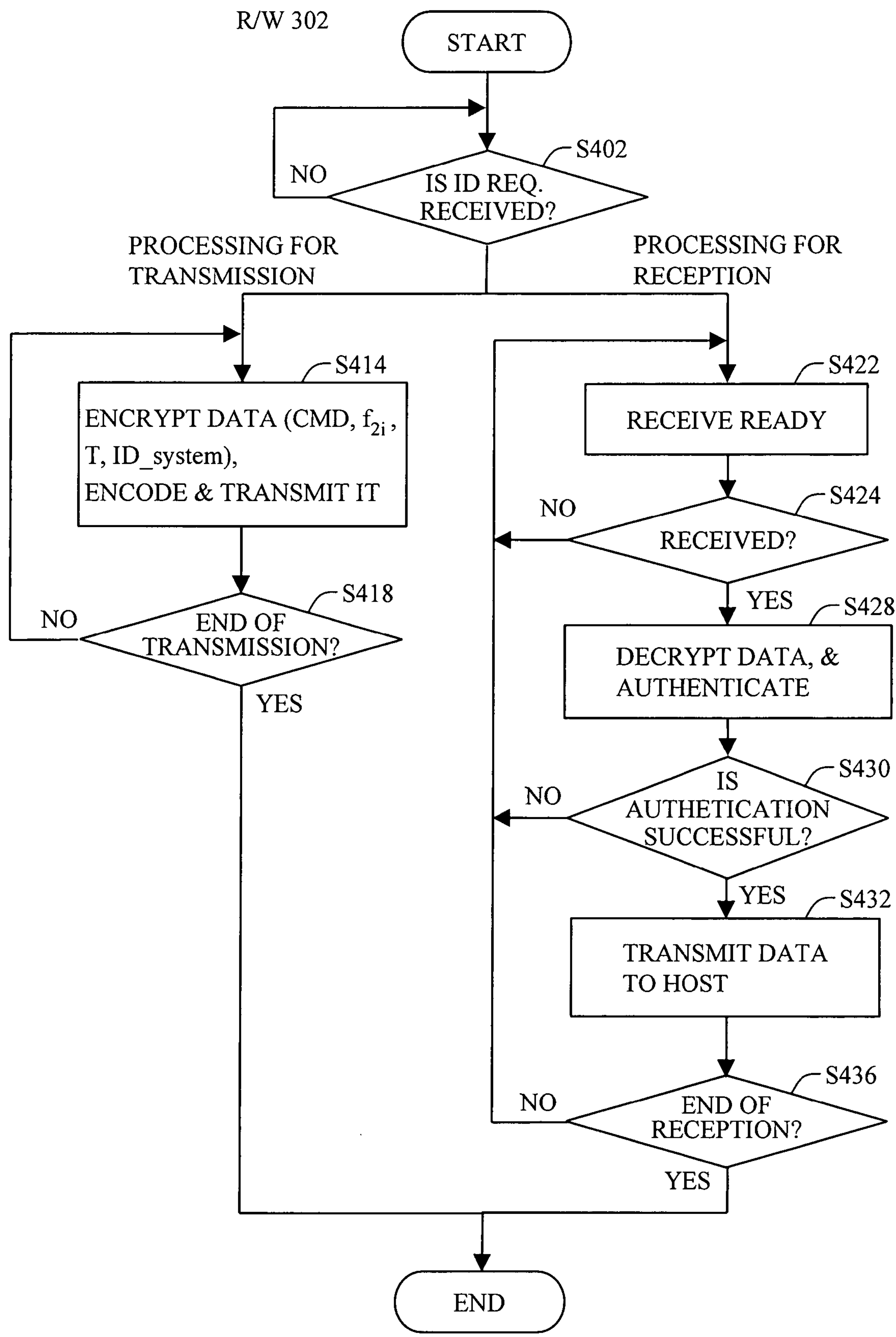
FIG. 8 shows a flow chart for the processing performed by the reader/writer device.
Figure 9A:
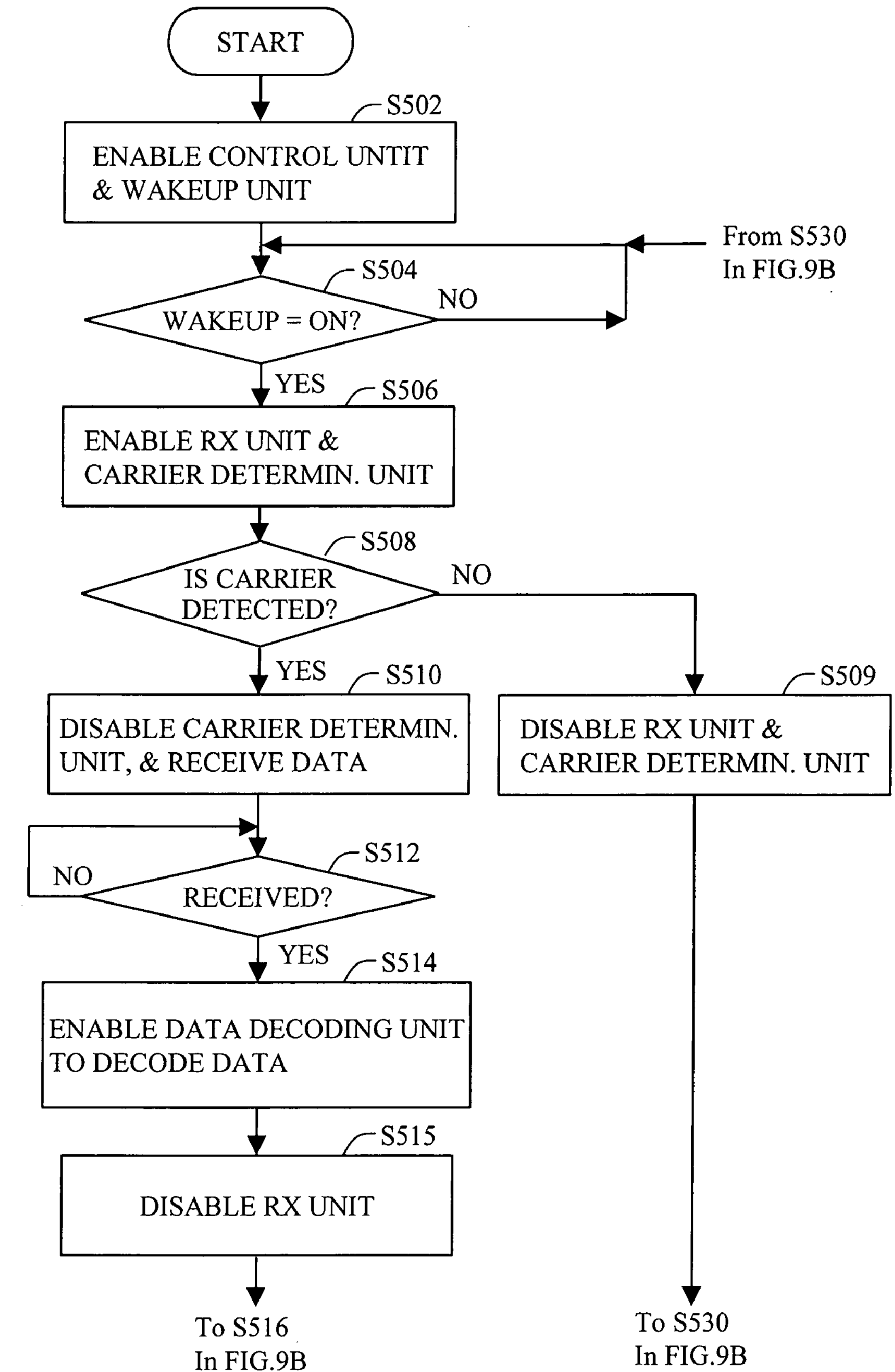
FIGS. 9A and 9B show a flow chart for the processing performed by the active-type RF ID tag.
Figure 9B:
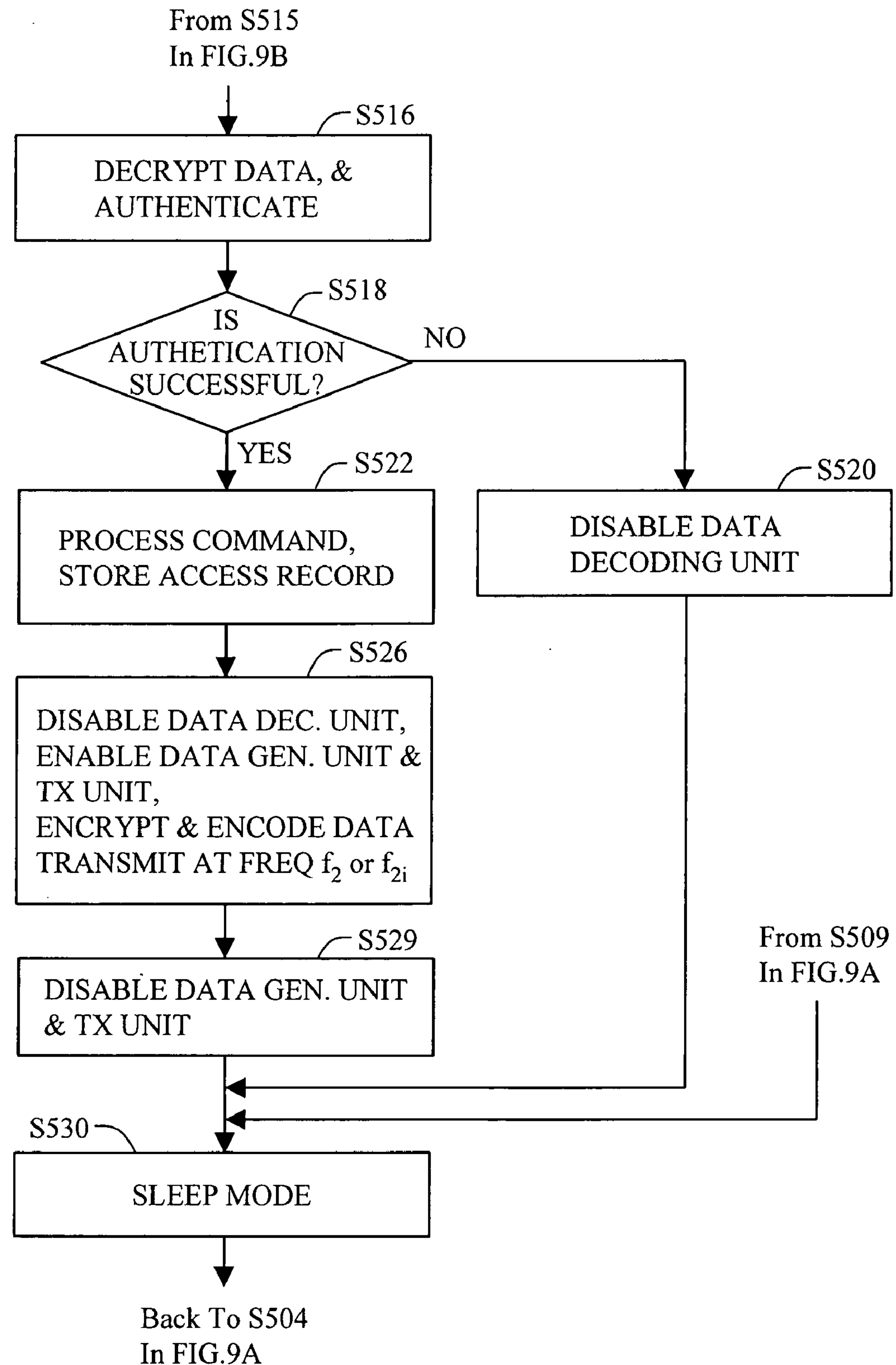

FIG. 8 shows a flow chart for the processing performed by the reader/writer device 302. FIGS. 9A and 9B show a flow chart for the processing performed by the active-type RF ID tag 202.

Referring to FIG. 8, Step 402 is similar to that of FIG. 4, and hence is not described again. At Step 414, the control unit 310 provides the ID request command to the data generation unit 322. The data generation unit 322 encrypts data containing the ID request command received from the control unit 310 and containing the current time-of-day information T and the system ID (ID_system) retrieved from the memory 314, with the encryption key Ke retrieved from the memory 314 in accordance with a predetermined cryptosystem, such as the DES (Data Description Standard), the Triple DES or the AES (Advanced Encryption Standard). Then, the data generation unit 322 encodes the encrypted data to thereby generate encoded data. The transmitter unit 332 modulates the carrier with the encrypted data, and then transmits the RF signal at the frequency $f_1$ (processing for transmission 42 in FIG. 7A). Step 418 is similar to that of FIG. 4, and hence is not described again.

Referring to FIG. 9A, Steps 502 through 515 are similar to those of FIG. 5, and hence are not described again.

Referring to FIG. 9B, at Step 516, under the control of the control unit 210, the data decoding unit 242 decrypts the decoded data with the encryption/decryption key Ke retrieved from the memory 214 in accordance with the predetermined cryptosystem, and then provides the decrypted data containing the command, the tag ID (ID_tag), the time-of-day information T, and the system ID (ID_system) to the control unit 210. The data may contain a control schedule and a time control sequence. Upon receiving the data, the control unit 210 compares the decrypted time-of-day T and system ID with the stored time-of-day T and system ID in the memory 214, to determine whether the decrypted time information and ID match with the stored time information and ID, in order to authenticate the reader/writer device 302.

At Step 518, the control unit 210 determines whether the authentication has been successful. If it is determined that authentication has been unsuccessful, the control unit 210 at Step 520 disables the data decoding unit 242. Then, the procedure proceeds to Step 530 of FIG. 9B.

If it is determined at Step 518 that the authentication has been successful, then the control unit 210 at Step 522 receives from the data decoding unit 242 the decrypted data containing the ID request command, then processes the decrypted received command contained in decoded data, and then stores into the memory 214 the record of access from the reader/writer device 302.

At Step 526, in accordance with the ID request command, the control unit 210 enables the data generation unit 222 and the transmitter unit 230 in a time slot selected at random in accordance with a random number from a predetermined number of time slots within a predetermined period of time. This selected time slot corresponds to the time period of the processing for transmission 56 of FIG. 7C. The data generation unit 222 encrypts data containing the tag ID (ID_tag) of the RF ID tag 202, the time-of-day information T and the system ID (ID_system) read out from the memory 214, with the encryption key Ke in accordance with the predetermined cryptosystem, then encodes the encrypted data in accordance with the predetermined encoding scheme, and then provides the encoded encrypted data to the transmitter unit 230. The transmitter unit 230 modulates the carrier with the encoded encrypted data, and then transmits the RF signal at a frequency $f_2$ via the antenna 284 (transmission 56 in FIG. 7C). Steps 528 and 530 are similar to those of FIG. 5, and hence are not described again.

Referring back to FIG. 8; Steps 422 through 424 are similar to those of FIG. 4, and hence are not described again. At Step 428, the receiver unit 350 provides the received data to the data decoding unit 342. The data decoding unit 342 decodes the received data in accordance with the predetermined encoding scheme, then decrypts the decoded data in accordance with the predetermined cryptosystem, and then provides the data reception and the decrypted data to the control unit 310. The control unit 310 compares the decrypted time T and system ID with the stored time T and system ID in the memory 314, to determine whether the decrypted time information and ID match with the stored time information and ID, in order to authenticate the RF ID tag 202. Even if there is an error between the received time-of-day information T and the stored time-of-day information T that falls within a predetermined range (e.g., ±0.5 seconds) in the control unit 210 of the RF ID tag 202 and in the control unit 310 of the reader/writer device 302, they may determine that the received time-of-day information matches with the stored time-of-day information.

At Step 430, the control unit 310 determines whether the authentication has been successful. If it is determined that the authentication has been unsuccessful, the procedure returns to Step 422. If it is determined that the authentication has been successful, the procedure proceeds to Step 432. Step 436 is similar to that of FIG. 4, and hence is not described again.

The active RF ID tag and the reader/writer device described above are also disclosed by the inventors of the present invention and other persons in the U.S. patent application Ser. No. 11/247,333, the entirety of which is incorporated herein by reference.

For the purpose of security, it is desirable to change sometimes the encryption/decryption key Ke for use in the reader/writer device 302 and the active RF ID tag 202. The reader/writer device 302 and the active RF ID tag 202 of FIG. 6 perform encryption and decryption with one common encryption/decryption key Ke. Thus, for the purpose of changing the encryption/decryption key Ke to be used in them, all of the encryption/decryption keys Ke stored in the reader/writer device and all of the related active RF ID tags have to be changed simultaneously. Accordingly, once the encryption/decryption keys stored in the RF ID tags are started to be changed or rewritten, the reader/writer device and any of the RF ID tags cannot be used, until all of the RF ID tags are collected and the change is completed for all of them.

The inventors have recognized that the reader/writer device may transmit alternately, in successive time slots at sufficiently short intervals, a frame of data containing the command and a new encryption key that are encrypted with the current encryption key and another frame of data containing the command that is encrypted with the new encryption key, and that each of the RF ID tags may receive and decrypt the new encryption key encrypted with the current encryption key and then set the new encryption key as an encryption/decryption key to be stored in that RF ID tag, so that the encryption keys of a plurality of the RF ID tags can be easily changed over time while the reader/writer device and the RF ID tags are continued to be used.

Figure 10:
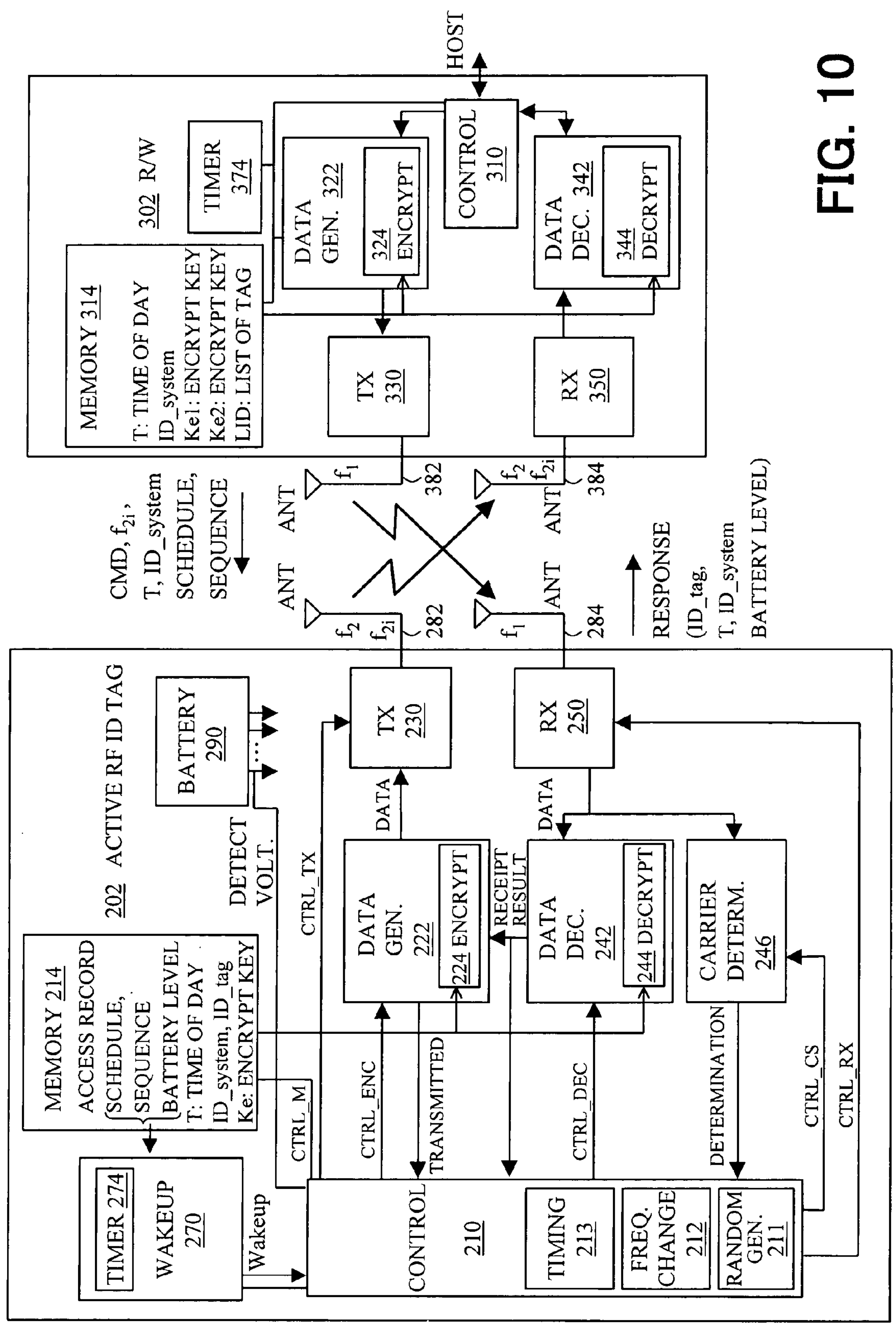
FIG. 10 shows configurations of an active RF ID tag and of a reader/writer device, in accordance with an embodiment of the present invention.

FIG. 10 shows configurations of an active RF ID tag 204 and of a reader/writer device 304, in accordance with an embodiment of the present invention. In this embodiment, the reader/writer device 304 can use two encryption/decryption keys Ke1 and Ke2 simultaneously, and can encrypt a tag ID request command (CMD) and also the encryption/decryption key Ke2 with the encryption/decryption key Ke1 and then transmit them as encrypted data. The RF ID tag 204 decrypts encrypted data such as a tag ID request command with its current one encryption/decryption key Ke1, then encrypts a response with the current encryption/decryption key Ke1 for transmission. The RF ID tag 204 can change the current encryption/decryption key Ke1 into the new encryption/decryption key Ke2 received from the reader/writer device 304.

In FIG. 10, in accordance with a command from the host computer, the control unit 310 of the reader/writer device 304 receives different pieces of data from the host computer to store them into the memory 314. The memory 314 stores one or two encryption/decryption keys as the first encryption/decryption key Ke1 and the second encryption/decryption key Ke2 respectively, and stores a list LID of tag IDs of all of the registered active RF ID tags. In accordance with a command from the reader/writer device 304, the control unit 210 of the RF ID tag 204 stores, into the memory 214, different pieces of data received from the reader/writer device 304. The memory 214 stores one rewritable encryption/decryption key Ke. The other elements and operations of the RF ID tag 204 and the reader/writer device 304 are similar to those of the RF ID tag 202 and the reader/writer device 302 in FIG. 6, and hence will not be described again.

Figures 11A, 11B, 11C, 11D:
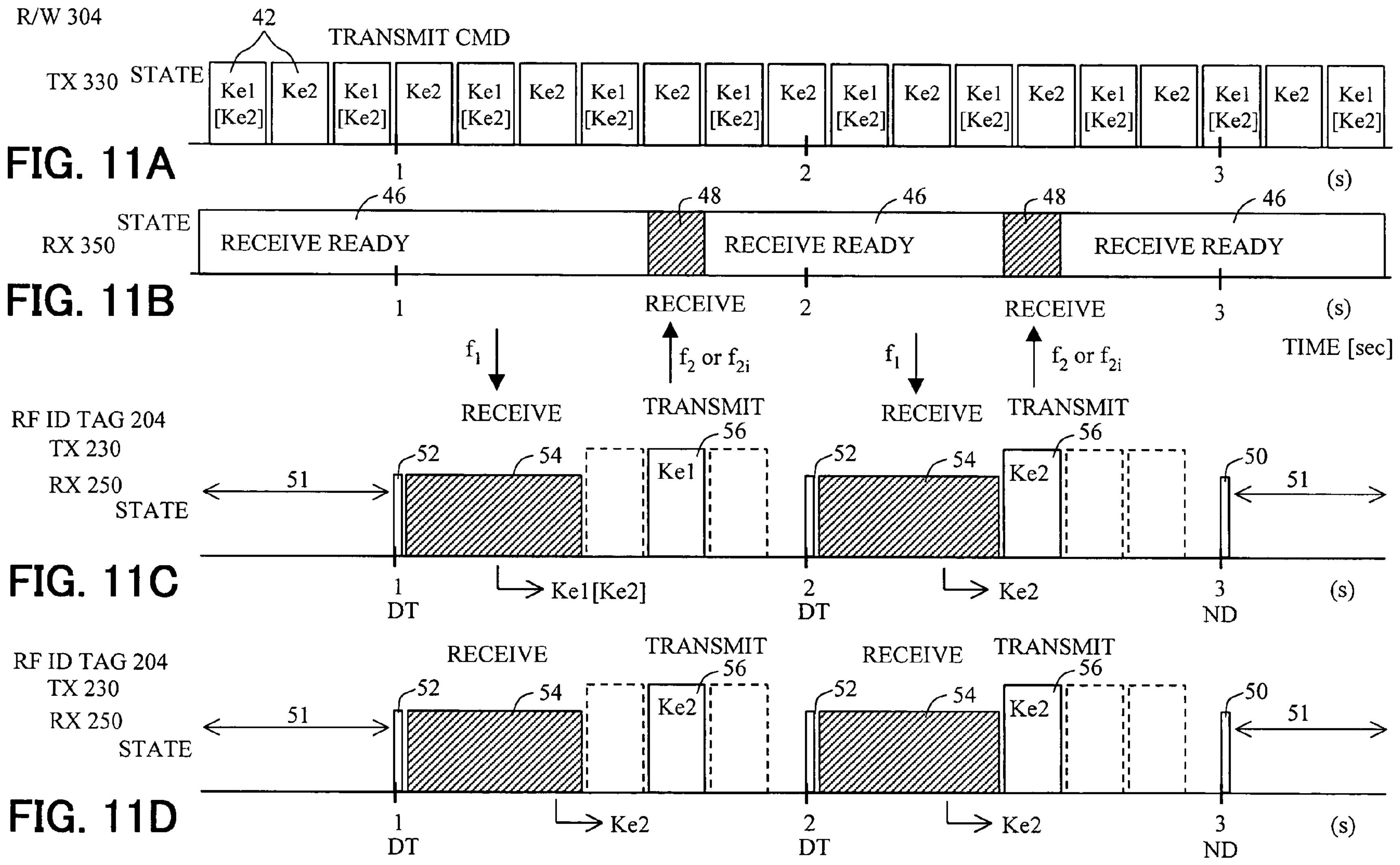
FIG. 11A shows a time chart of processing for transmission of an RF signal that carries frames of data, each frame of data containing a tag ID request or information request command (CMD) encrypted with corresponding one of two respective encryption keys, in the reader/writer device.
FIG. 11B shows a time chart of a receive ready state and processing for reception of a received RF signal, in the reader/writer device.
FIGS. 11C and 11D show respective different time charts of carrier sensing, processing for reception of a received RF signal, and processing for transmission of an RF signal that carries a response encrypted with either one of encryption keys, in the RF ID tag.

FIG. 11A shows a time chart of processing for transmission 42 of an RF signal that carries frames of data, each frame of data containing a tag ID request or information request command (CMD) encrypted with corresponding one of two respective encryption keys Ke1 and Ke2, in the reader/writer device 304. FIG. 11B shows a time chart of a receive ready state 46 and processing for reception 48 of a received RF signal, in the reader/writer device 304. FIGS. 11C and 11D show respective different time charts of carrier sensing 50 and 52, processing for reception 54 of a received RF signal, and processing for transmission 56 of an RF signal that carries a response encrypted with either one of encryption keys Ke1 and Ke2, in the RF ID tag 204.

Referring to FIG. 11A, the data generation unit 322 of the reader/writer device 304 generates data containing the tag ID request or information request command and a new encryption/decryption key Ke2 for the RF ID tag that are received from the control unit 310, and then encrypts the data with the encryption key Ke1 in accordance with the predetermined cryptosystem to thereby generate a first frame of encrypted data. The data generation unit 322 further generates data containing the tag ID request or information request command, and then encrypts the data with the new encryption/decryption key Ke2 in accordance with the predetermined cryptosystem to thereby generate a second frame of encrypted data. The data generation unit 322 encodes the first and second frames of encrypted data alternately in accordance with the predetermined encoding scheme, to thereby generate two different frames of encoded encrypted data. The transmitter unit 230 transmits an RF signal at a frequency $f_1$ that carries each of the two frames of encrypted data alternately in successive time slots at sufficiently short intervals.

The other operation for transmission of the reader/writer device 304 is similar to that of the reader/writer device 302 of FIG. 7A, and hence is not described again.

FIGS. 12A and 12B show examples of frames of data encrypted with the respective encryption/decryption keys Ke1 and Ke2.

Referring to FIG. 12A, the frame of encrypted data, which is encrypted with the encryption/decryption key Ke1, includes a frame header, frame data encrypted with the encryption key Ke1, and a CRC. The frame data includes a plurality of fields of an encryption/decryption key Ke2, date and time of day, a system ID, a command, a data length, variable data, and dummy data.

Referring to FIG. 12B, the frame of encrypted data, which is encrypted with the encryption/decryption key Ke2, includes a frame header, frame data encrypted with the encryption key Ke2, and a CRC. The frame data includes a plurality of fields of dummy data in place of an encryption/decryption key, date and time of day, a system ID, a command, a data length, variable data, and dummy data.

FIG. 13 shows an example of a list LID of tag IDs of registered active RF ID tags that is stored in the memory 314 of the reader/writer device 304. The list LID includes the tag IDs of the registered RF ID tag and their currently effective encryption/decryption keys Ke1/Ke2.

Referring to FIG. 1C, in the active RF ID tag 204, the receiver unit 250 and the carrier determination unit 246 performs carrier sensing similarly to that of FIG. 7C.

When the RF ID tag 204 enters into the communication range of the reader/writer device 304, in response to a resultant determination of the presence of a carrier (DT) made by the carrier determination unit 246, the receiver unit 250 and the data decoding unit 242 are enabled in a predetermined duration, such as a time length of three frames of data, in the period of subsequent processing for reception 54. The receiver unit 250 receives and demodulates an RF signal at the frequency $f_1$, and thereby generates two successive frames of encoded encrypted data containing respective different commands. The time length of three frames of data should be sufficient to receive two successive frames of encoded encrypted data. The data decoding unit 242 decodes the encoded encrypted data in accordance with the predetermined encoding scheme, then decrypts decryptable one of the frames of encrypted data with the encryption/decryption key Ke=Ke1 stored in the memory 214 in accordance with the predetermined cryptosystem to thereby extract a command from the decrypted encrypted data frame, and then provides the command to the control unit 210. The other frame of encrypted data which is encrypted with the encryption/decryption key Ke2 cannot be decrypted with the encryption/decryption key Ke=Ke1. In response to receipt of this command, the control unit 210 authenticates the reader/writer device 304 in accordance with the time of day information T and the system ID contained together with the command.

When the authentication has been successful, the control unit 210 enables the data generation unit 222 and the transmitter unit 230 in a period of processing for transmission 56 selected at random within a predetermined period of time. Then, the data generation unit 222 encrypts data containing the tag ID (ID_tag), the time-of-day information T and the system ID (ID_system) retrieved from the memory 214 with the encryption key Ke=Ke1 in accordance with the predetermined cryptosystem, and then encodes the encrypted data in accordance with the predetermined encoding scheme. The transmitter unit 230 modulates the carrier with the response data containing the encrypted tag ID, and thereby transmits an RF response signal at the frequency $f_2$ or $f_{21}$. Alternatively, the data generation unit 222 may encrypt the response data with the received new encryption/decryption key Ke2. After that, when a new encryption/decryption key Ke2 different from the current encryption/decryption key Ke=Ke1 is contained in the decrypted data, the control unit 210 sets the encryption/decryption key Ke=Ke2 as the encryption/decryption key Ke.

Referring to FIG. 11B, the receiver unit 350 of the reader/writer device 304 is in the receive ready state 46, and then demodulates the received RF signal in the period of processing for reception 48 to thereby reproduce the frame of the encoded encrypted data. The data decoding unit 342 decodes the encoded encrypted data in accordance with the predetermined encoding scheme, then decrypts the decoded encrypted data in accordance with the predetermined cryptosystem with the encryption/decryption key Ke1 or Ke2 stored in the memory 314 to thereby reproduce the response data containing the tag ID, and then provides the reproduced response to the control unit 310. In response to the received and reproduced response, the control unit 310 authenticates the RF ID tag 204 in accordance with the time-of-day information T and the system ID contained in the response, and then provides the tag ID and other information to the host computer. When the reception and decryption of the response data encrypted with the encryption/decryption key Ke1 have been successful, the control unit 310 changes the encryption/decryption key Ke1 of the tag ID of the corresponding RF ID tag 204 in the list LID stored in the memory 314 into the new encryption/decryption Ke2.

Referring back to FIG. 1C, after that, in response to a resultant determination of the presence of a carrier (DT) made by the carrier determination unit 246, the receiver unit 250 and the data decoding unit 242 are enabled in the next period of processing for reception 54. Then, the receiver unit 250 receives and demodulates the RF signal at the frequency $f_1$, and thereby generates two successive pieces of encoded encrypted data containing the respective commands. The data decoding unit 242 decodes the data in accordance with the predetermined encoding scheme, then decrypts decryptable one of the encrypted data frames in accordance with the predetermined cryptosystem with the encryption/decryption key Ke=Ke2 stored in the memory 214 to thereby extract the command, and then provides the command to the control unit 210. The other encrypted frame of data which is encrypted with the encryption/decryption key Ke1 cannot be decrypted with the encryption/decryption key Ke=Ke2. In response to receipt of this command, the control unit 210 authenticates the reader/writer device 304 in accordance with the data contained together with the command.

When the authentication has been successful, the data generation unit 222 and the transmitter unit 230 are enabled in a period of processing for transmission 56 selected at random within a predetermined period of time. The data generation unit 222 encrypts required data extracted from the memory 214, with the encryption key Ke=Ke2 in accordance with the predetermined cryptosystem, and then encodes the encrypted data in accordance with the predetermined encoding scheme. The transmitter unit 230 modulates the carrier with the response data containing the encrypted tag ID, and thereby transmits an RF response signal at the frequency $f_2$ or $f_{21}$.

FIG. 11D is a time chart of processing for reception 54 of a received RF signal and processing for transmission 56 of an RF signal that carries a response encrypted with the encryption/decryption key Ke2 in the RF ID tag 204, when the RF ID tag 204 having the encryption/decryption key Ke=Ke2, as changed in the first processing for reception 54 of FIG. 11C, enters into the communication range of the reader/writer device 304. The RF ID tag 204 performs processing similar to that of the second processing for reception 54 and processing for transmission 56 of FIG. 11C.

In this way, the reader/writer device 304 can change the encryption/decryption key Ke1 to the encryption/decryption key Ke2 in the RF ID tags over time, which enter into the communication range of the reader/writer device 304. Thus the reader/writer device 304 can ultimately change the encryption/decryption keys of all of the RF ID tags 204.

Figure 14:
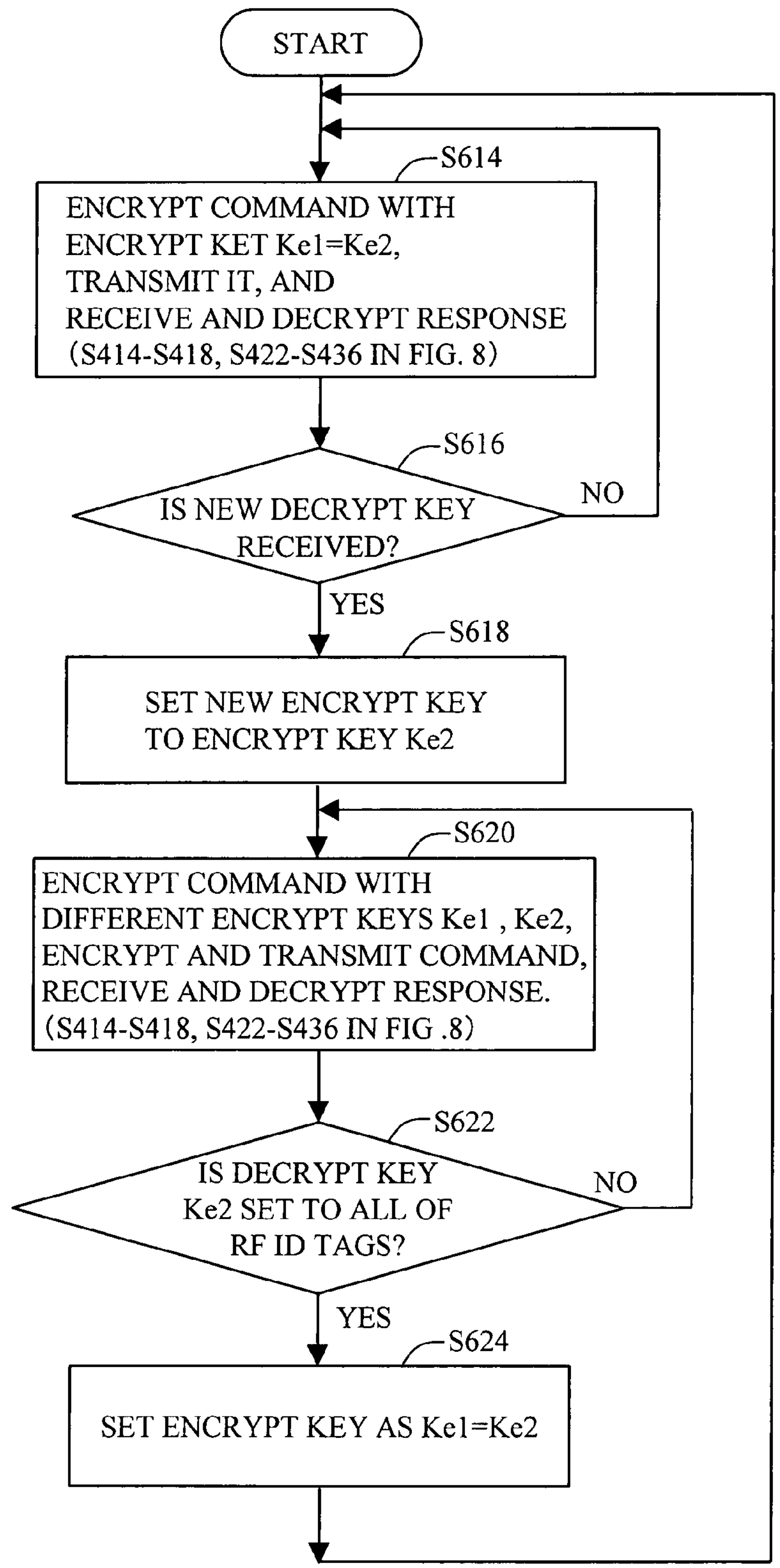
FIG. 14 is a flow chart for the processing performed by the reader/writer device.
Figure 15:
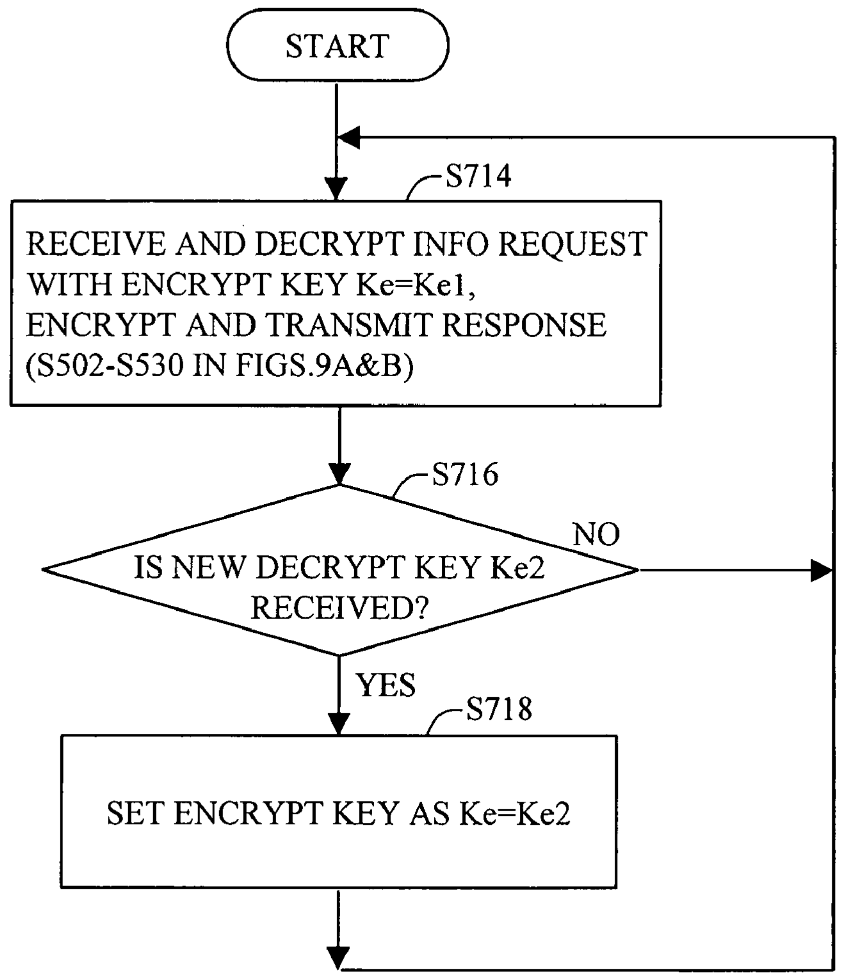
FIG. 15 is a flow chart for the processing performed by the active RF ID tag.

FIG. 14 is a flow chart for the processing performed by the reader/writer device 304. FIG. 15 is a flow chart for the processing performed by the active RF ID tag 204.

Referring to FIG. 14, at Step 614, in accordance with Steps 414-418 and Steps 422-436 of FIG. 8, the control unit 310 of the reader/writer device 304 encrypts data to be transmitted containing a tag ID request command in accordance with the predetermined cryptosystem with the same one encryption/decryption key Ke1 which has been received from the host computer and then stored as each of the encryption/decryption keys Ke1 and Ke2 in the memory 314. The control unit 310 then generates repeatedly in successive time slots at sufficiently short intervals a frame of encoded data which has been encoded in accordance with the predetermined encoding scheme, then modulates the carrier with the frame of the encoded data, and thereby transmits the RF signal at the frequency $f_1$.

At Step 616, the control unit 310 determines whether it has a new received encryption/decryption key (Ke2) that is different from the encryption/decryption key Ke1 and is received from the host computer, i.e., whether it is required to perform the processing of changing the encryption/decryption key Ke1 into a new encryption/decryption key (Ke2) in the reader/writer 304 and the associated active RF ID tags. If it is determined that it is not required to perform the processing of changing the encryption/decryption key Ke1, the procedure returns to Step 614.

If it is determined that it is required to perform the processing of changing the encryption/decryption key, the control unit 310 at Step 618 sets the new encryption/decryption key (Ke2: Ke1) to the encryption/decryption key Ke2 in the memory 314, while maintaining the current encryption/decryption key Ke1 in the memory 314.

At Step 620, in accordance with Steps 414-418 and Steps 422-436 of FIG. 8, the control unit 310 encrypts data to be transmitted containing a tag ID request command and the new encryption/decryption key Ke2 with the current encryption key Ke1 in accordance with the predetermined cryptosystem to thereby generate first encrypted data, then encrypts data to be transmitted containing a tag ID request command with the new encryption key Ke2 (≠Ke1) in accordance with the predetermined cryptosystem to thereby generate second encrypted data, then encodes the first and second frames of encrypted data alternately in accordance with the predetermined encoding scheme to thereby generate frames of encoded data, and then modulates the carrier with the frames of the encoded data to thereby transmit the RF signal at the frequency $f_1$ continually.

At Step 622, the control unit 310 looks up the list LID in the memory 314, and thereby determines whether the new encryption/decryption key Ke2 has been set up in all of the RF ID tags in the list LID. If it is determined that the new encryption/decryption key Ke2 is set up not in all RF ID tags, then the procedure returns to Step 620.

If it is determined that the new encryption/decryption key Ke2 has been set up in all of the RF ID tags, the control unit 310 at Step 624 deletes the former encryption/decryption key Ke1, and then sets the new encryption/decryption key Ke2 also to the encryption/decryption key Ke1. After that, the procedure returns to Step 614.

Referring to FIG. 15, at Step 714, in accordance with Steps 502-530 of FIGS. 9A and 9B, the control unit 210 of the RF ID tag 204 receives and demodulates the RF signal that carries the frame of encrypted data containing the command and the like, then decodes the demodulated encrypted data frame in accordance with the predetermined encoding scheme to thereby generate a frame of decoded encrypted data, then decrypts the frame of decoded encrypted data in accordance with the predetermined cryptosystem with the encryption/decryption key Ke=Ke1 stored in the memory 214 to thereby extract data containing the command, and then provides the data to the control unit 210. The control unit 210 authenticates the reader/writer device 304 in accordance with the time-of-day information T and the system ID contained in the command. When the authentication has been successful, the data generation unit 222 and the transmitter unit 230 are enabled in a period of processing for transmission 56 selected at random within the predetermined of time. The data generation unit 222 encrypts the response data containing the tag ID (ID_tag), the time-of-day information T, and the system ID (ID_system) retrieved from the memory 214, with the encryption/decryption key Ke=Ke1 in accordance with the predetermined cryptosystem to thereby generate a frame of encrypted data, then encodes the frame of encrypted data in accordance with the predetermined encoding scheme to thereby generate a frame of encoded encrypted data, then modulates the carrier with the frame of the encoded response data to thereby transmit the RF signal.

At Step 716, the control unit 210 determines whether the RF ID tag 204 has received, from the reader/writer device 304, a new encryption/decryption key Ke2 different from the current encryption/decryption key Ke=Ke1. If it is determined that no new encryption/decryption key Ke2 has been received, the procedure returns to Step 714.

If it is determined at Step 716 that a new encryption/decryption key Ke2 has been received, the control unit 210 at Step 718 sets the new encryption/decryption key Ke=Ke2 to the encryption/decryption key Ke. After that, the procedure returns to Step 714.

Although the invention has been described in connection with application to the RF ID tags, it should be understood by those skilled in the art that the invention is not limited to this application and is also applicable to contactless IC cards.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An information access system for accessing information stored in a contactless information storage device, the information access system comprising: a reader/writer device that is connectable to an information processing apparatus, and comprises:

a first memory, a first control unit, a first encryption unit that encrypts request data that comprises an information request to generate encrypted data, a first transmitter unit that transmits an information request signal at a first frequency in transmission time periods in a transmission cycle that carries the encrypted data, a first receiver unit configured to be continuously ready to receive an RF signal at a second frequency different from the first frequency, and a first decryption unit that decrypts other encrypted data carried by an RF signal at the second frequency; and an active-type contactless information storage device that comprises:

a second memory, a second control unit, a second receiver unit that senses a carrier of an RF signal at the first frequency for detection, a second decryption unit that decrypts encrypted data carried by the information request signal at the first frequency to reproduce the request data, a second encryption unit that encrypts, in response to the information request in the reproduced request data, response data that comprises an identification stored in the second memory to generate response encrypted data, and a second transmitter unit that transmits a response signal at the second frequency that carries the response encrypted data, wherein in response to a request from the information processing apparatus, and under the control of the first control unit, the first encryption unit, encrypts, using a first encryption key stored in the first memory, first data that comprises the information request and a second encryption key to generate first encrypted data and encrypts second data that comprises the information request, using the second encryption key stored in the first memory, to generate second encrypted data, and the first transmitter unit transmits the information request signal at the first frequency that carries alternately in successive time slots the first encrypted data and the second encrypted data, and under the control of the second control unit, the second receiver unit senses a carrier of an RF signal at the first frequency in carrier sensing periods that occur in a carrier sensing cycle, wherein when the second receiver unit senses and detects a carrier of an RF signal at the first frequency in one of the carrier sensing periods, under the control of the second control unit, the second receiver unit further receives the information request signal at the first frequency, and the second decryption unit decrypts, using an active encryption key stored in the second memory, the encrypted data carried by the information request signal at the first frequency to reproduce the data, wherein the active encryption key stored in the second memory is the first or second encryption key, and in response to the information request in the data reproduced by the second decryption unit, the second encryption unit encrypts the response data using the active encryption key stored in the second memory to generate the response encrypted data, and the second transmitter unit transmits the response signal at the second frequency that carries the response encrypted data, wherein the first receiver unit receives the response signal at the second frequency, the first decryption unit decrypts the response encrypted data carried by the response signal at the second frequency, using the corresponding first or second encryption key stored in the first memory to reproduce the response data, and when the second encryption key different from the active encryption key stored in the second memory is in the data reproduced by the second decryption unit, the second control unit sets the second encryption key as the active encryption key to be stored in the second memory.

2. An information access system according to claim 1, wherein the first control unit initially sets a same one encryption key as each of the first encryption key and the second encryption key, and the first control unit sets, as the second encryption key, a new encryption key different from the first encryption key, when the first control unit receives the new encryption key from the information processing apparatus.

3. An information access system according to claim 1, further comprising a plurality of such active-type contactless information storage devices, wherein when it is determined that the response encrypted data in response to the first encrypted data is received from each of all of the plurality of active-type contactless information storage devices, the first control unit sets the second encryption key also as the first encryption key to be stored in the first memory.

4. An information access system according to claim 1, wherein the second receiver unit receives the information request signal at the first frequency during a length of time sufficient to receive both of the first and second encrypted data.

5. An information access system according to claim 1, wherein the second encryption unit encrypts the response encrypted data using the first encryption key as the active encryption key, before the second control unit sets the second encryption key as the active encryption key to be stored in the second memory.

6. An information access system according to claim 1, wherein the second control unit causes, in carrier sensing periods, the second receiver unit to be in an active state and the second transmitter unit to be in an inactive state, and when the second receiver unit attempts to sense a carrier of an RF signal at the first frequency in one of the carrier sensing periods but detects no carrier, the second control unit controls the second receiver unit and the second transmitter unit to maintain the inactive state during a non-carrier-sensing period between the one carrier sensing period and a subsequent one of the carrier sensing periods.

7. A reader/writer device connectable to an information processing apparatus and configured to communicate with a plurality of contactless information storage devices, the reader/writer device comprising:

a memory, a control unit, an encryption unit that encrypts request data that comprises an information request to generate encrypted data, a transmitter unit that transmits an information request signal at a first frequency in transmission time periods in a transmission cycle that carries the encrypted data, a receiver unit configured to be continuously ready to receive an RF signal at a second frequency different from the first frequency, and a decryption unit that decrypts other encrypted data carried by an RF signal at the second frequency, wherein in response to a request from the information processing apparatus, and under the control of the control unit, the encryption unit encrypts, using a first encryption key stored in the first memory, first data that comprises the information request and a second encryption key that can be used as a new encryption key to generate first encrypted data and encrypts second data that comprises the information request, using the second encryption key stored in the memory, to generate second encrypted data, and the transmitter unit transmits the information request signal at the first frequency that carries alternately in successive time slots the first encrypted data and the second encrypted data, wherein the receiver unit receives the response signal at the second frequency, and the decryption unit decrypts the other encrypted data carried by an RF signal at the second frequency, using the corresponding first or second encryption key stored in the memory, to reproduce the response data.

8. A reader/writer device according to claim 7, wherein when it is determined that the response encrypted data in response to the first encrypted data is received from each of all of the plurality of contactless information storage devices, the control unit sets the second encryption key also as the first encryption key to be stored in the memory.

9. An active-type contactless information storage device configured to communicate with a reader/writer device, the active-type contactless information storage device comprising:

a memory, a control unit, a receiver unit that senses a carrier of an RF signal at a first frequency for detection, a decryption unit that decrypts first encrypted data or second encrypted data that is carried by an information request signal at the first frequency that occurs in transmission time periods in a transmission cycle to reproduce request data that comprises an information request, an encryption unit that encrypts, in response to the information request in the reproduced request data, response data that comprises an identification stored in the memory to generate response encrypted data, and a transmitter unit that transmits a response signal at a second frequency that carries the response encrypted data, wherein the second frequency is different from the first frequency, wherein under the control of the control unit, in carrier sensing periods that occur in a carrier sensing cycle, the transmitter unit is in an inactive state and the receiver unit is in an active state and senses a carrier of an RF signal at the first frequency, wherein when the receiver unit senses and detects a carrier of an RF signal at the first frequency in one of the carrier sensing periods, under the control of the control unit, the receiver unit further receives an RF signal at the first frequency during a length of time sufficient to receive both of the first and second encrypted data alternately in successive time slots carried by the information request signal, and the decryption unit decrypts, using an active encryption key stored in the memory, the first or second encrypted data carried by the information request signal at the first frequency to reproduce the data, in response to the information request contained in the data reproduced by the decryption unit, the encryption unit encrypts the response data using the active encryption key stored in the memory to generate the response encrypted data, and the transmitter unit transmits the response signal at the second frequency that carries the response encrypted data, wherein when a further encryption key different from the active encryption key stored in the memory is contained in the data reproduced by the decryption unit, the control unit sets the further encryption key as the active encryption key to be stored in the memory, and when the receiver unit detects no carrier in one of the carrier sensing periods, under the control of the control unit, the receiver unit and the transmitter unit are in the inactive state during a non-carrier-sensing period between the one carrier sensing period and a subsequent one of the carrier sensing periods.

10. A non-transitory storage medium storing a program for use in a reader/writer device that is connectable to an information processing apparatus and communicates with a plurality of contactless information storage devices, the reader/writer device comprising: a memory, a control unit, an encryption unit that encrypts request data that comprises an information request to generate encrypted data, a transmitter unit that transmits an information request signal at a first frequency in transmission time periods in a transmission cycle that carries the encrypted data, a receiver unit configured to be continuously ready to receive an RF signal at a second frequency different from the first frequency, and a decryption unit that decrypts other encrypted data carried by an RF signal at the second frequency, the program being operable to effect:

in response to a request from the information processing apparatus, and under the control of the control unit, causing the encryption unit to encrypt, using a first encryption key stored in the first memory, first data containing the information request and a second encryption key that can be used as a new encryption key to generate first encrypted data and encrypt second data that comprises the information request, using the second encryption key stored in the memory, to generate second encrypted data, and causing the transmitter unit to transmit the information request signal at the first frequency that carries alternately in successive time slots the first encrypted data and the second encrypted data, causing the receiver unit to receive the response signal at the second frequency, and causing the decryption unit to decrypt the other encrypted data carried by an RF signal at the second frequency, using the corresponding first or second encryption key stored in the memory, to reproduce the response data.

11. A non-transitory storage medium storing a program for use in a contactless information storage device configured to communicate with a reader/writer device, the contactless information storage device comprising: a memory, a control unit, a receiver unit that senses a carrier of an RF signal at a first frequency for detection, a decryption unit that decrypts first encrypted data or second encrypted data that is carried by an information request signal at the first frequency that occurs in transmission time periods in a transmission cycle to reproduce request data that comprises an information request, an encryption unit that encrypts, in response to the information request in the reproduced request data, response data that comprises an identification stored in the memory to generate response encrypted data, and a transmitter unit that transmits a response signal at a second frequency that carries the response encrypted data, the second frequency being different from the first frequency, the program being operable to effect:

under the control of the control unit, in carrier sensing periods that occur in a carrier sensing cycle, causing the transmitter unit to be in an inactive state and the receiver unit to be in an active state and sense a carrier of an RF signal at the first frequency, when the receiver unit senses and detects a carrier of an RF signal at the first frequency in one of the carrier sensing periods, under the control of the control unit, causing the receiver unit to further receive an RF signal at the first frequency during a length of time sufficient to receive both of the first and second encrypted data alternately in successive time slots, and causing the decryption unit to decrypt, using an active encryption key stored in the memory, the first or second encrypted data carried by the information request signal at the first frequency to reproduce the data, in response to the information request contained in the data reproduced by the decryption unit, causing the encryption unit to encrypt the response data using the active encryption key stored in the memory to generate the response encrypted data, and causing the transmitter unit to transmit the response signal at the second frequency that carries the response encrypted data, when a further encryption key different from the active encryption key stored in the memory is contained in the data reproduced by the decryption unit, causing the control unit to set the further encryption key as the active encryption key to be stored in the memory, and when the receiver unit detects no carrier in one of the carrier sensing periods, under the control of the control unit, causing the receiver unit and the transmitter unit to be in the inactive state during a non-carrier-sensing period between the one carrier sensing period and a subsequent one of the carrier sensing periods.

12. In a reader/writer device connectable to an information processing apparatus and configured to communicate with a plurality of contactless information storage devices, a method for communicating with a plurality of contactless information storage devices, the reader/writer device comprising: a memory, a control unit, an encryption unit that encrypts request data containing an information request to generate encrypted data, a transmitter unit that transmits an information request signal at a first frequency in transmission time periods in a transmission cycle that carries the encrypted data, a receiver unit configured to be continuously ready to receive an RF signal at a second frequency different from the first frequency, and a decryption unit that decrypts other encrypted data carried by an RF signal at the second frequency, the method comprising:

in response to a request from the information processing apparatus, and under the control of the control unit, causing the encryption unit to encrypt, using a first encryption key stored in the memory, first data that comprises the information request and a second encryption key that can be used as a new encryption key to generate first encrypted data and encrypt second data that comprises the information request, using the second encryption key stored in the memory, to generate second encrypted data, and causing the transmitter unit to transmit the information request signal at the first frequency that carries alternately in successive time intervals the first encrypted data and the second encrypted data, causing the receiver unit to receive the response signal at the second frequency, and causing the decryption unit to decrypt other encrypted data carried by an RF signal at the second frequency, using the corresponding first or second encryption key stored in the memory to reproduce the response data.

* * * * *